United States Patent [19]

Kaneko et al.

[11] Patent Number: 5,517,295
[45] Date of Patent: May 14, 1996

[54] IMAGE FORMING APPARATUS HAVING COMPOSITE MODES SELECTABLE DURING JAM RECOVERY

[75] Inventors: Satoshi Kaneko; Satoru Kutsuwada, both of Kawasaki, Japan

[73] Assignee: Canon Kabushiki Kaisha, Tokyo, Japan

[21] Appl. No.: 63,775

[22] Filed: May 20, 1993

[30] Foreign Application Priority Data

Jun. 2, 1992 [JP] Japan .................................. 4-167012

[51] Int. Cl.⁶ .............................................. G03G 21/00
[52] U.S. Cl. ................................ 355/313; 355/207/308
[58] Field of Search .................................. 355/313, 314, 355/319, 320, 205–209, 23, 24, 244; 271/279, 245, 291, 3.06, 9.01

[56] References Cited

U.S. PATENT DOCUMENTS

| | | | |
|---|---|---|---|
| 4,264,187 | 4/1981 | Rhodes, Jr. ........................ | 355/319 X |
| 4,327,993 | 5/1982 | Gauronski et al. ................ | 355/207 |
| 4,421,404 | 12/1983 | Conly ................................ | 271/3.1 X |
| 5,105,225 | 4/1992 | Honjo et al. ...................... | 355/233 |

*Primary Examiner*—A. T. Grimley
*Assistant Examiner*—Shuk Y. Lee
*Attorney, Agent, or Firm*—Fitzpatrick, Cella, Harper & Scinto

[57] ABSTRACT

An image forming apparatus includes a recycling automatic original document feeder for automatically feeding a plurality of originals mounted on an original mount to an image reading position and for discharging the originals so as to be returned onto the original mount after the images of the originals have been read. The apparatus further includes an original image reading device, an image recording device for recording the image on a recording medium, a mode inputting device for inputting an image forming mode, a copy-number setting device for setting a required number of image copies, a recording-medium conveying device including a recording-medium detection device, and an intermediate tray for storing the recording medium after image formation. The apparatus further includes a device for selecting switching between the first image forming mode and the second image forming mode, and an original-number counting device. When a recovering operation is performed after the occurrence of a jam, one of the first image forming mode and the second image forming mode is selected in accordance with the number of originals, the required number of remaining copies or a selection by an operator.

5 Claims, 17 Drawing Sheets

RDF MODE

COPIES OF DIFFERENT
ORIGINALS IN
INTERMEDIATE TRAY

ADF MODE

COPIES OF THE SAME
ORIGINAL IN
INTERMEDIATE TRAY

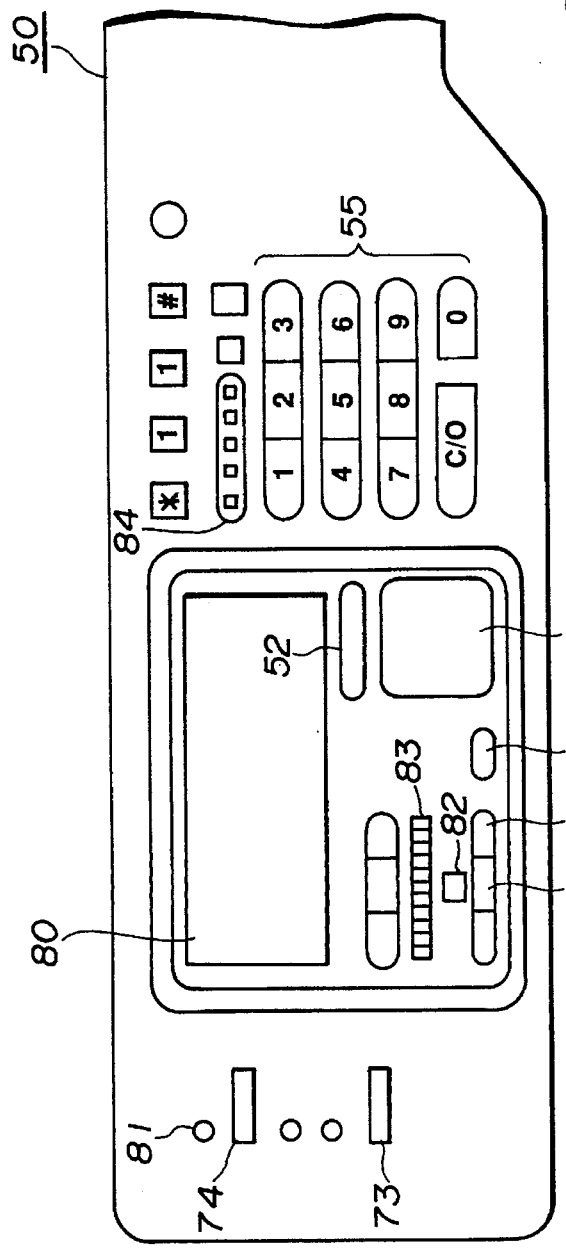
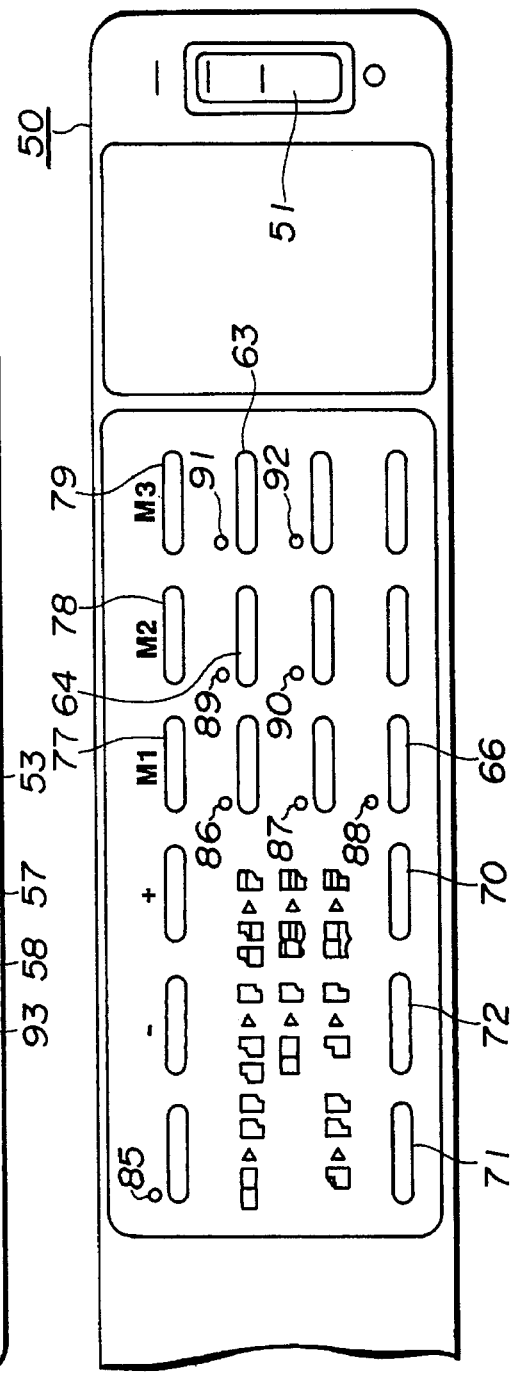
FIG.11(a)
FIG.11(b)

DUPLEX PROCESS

MULTIPLEX PROCESS

DUPLEX PROCESS

IMAGE FORMING APPARATUS HAVING COMPOSITE MODES SELECTABLE DURING JAM RECOVERY

BACKGROUND OF THE INVENTION

1. Field of the Invention

This invention relates to an image forming apparatus having composite modes, and more particularly, to an image forming apparatus having duplex and/or multiplex composite modes.

2. Description of the Related Art

Image forming apparatuses having a recycling automatic document (original) feeder (conveyor) (hereinafter termed an RDF) combined with the main body of the image forming apparatus, such as a copier or the like, are generally known. In such devices, a bundle of originals is set on an original mount (tray) and the originals are individually fed to an image reading position (exposing position) starting with the final page. The original, whose image has been read (exposed), is thereafter returned to the original mount.

In one copying mode a plurality of images are formed from each original using an RDF in a single-sided original—duplex image forming mode (simplex/duplex copy), in which respective images are formed on two surfaces of a recording medium (transfer paper or the like) from two single-sided originals. In that mode the image forming apparatus has (a) a "first image forming mode", wherein, there is a first recycling operation in which each original is recycled a plurality of times, an image is formed from every other original while the number of originals is counted, copies with formed images are stored in an intermediate tray, sheets of the recording medium are alternately fed for image formation from a recording-medium feeding unit and the intermediate tray in respective recycling operations from a second recycling operation up to a final recycling operation corresponding to the number of copies, and image formation is performed while feeding every other original from the intermediate tray in the final recycling operation, and (b) a "second image forming mode", in which a plurality of copies are formed from each original while performing only one recycling operation.

When a sheet jam has occurred "during a sheet-feeding operation from the intermediate tray" or "during an image forming mode", the following two types of recovering operations are provided.

a) A "first recovering operation", in which after returning to a predetertermined original in the first recycling operation, an image is formed from every other original, and formed images are stored in the intermediate tray. After returning to the predetermined original in the second recycling operation, sheets of the recording medium are alternately fed for image formation from the feeding unit and the intermediate tray in respective recycling operations from a second recycling operation up to a final recycling operation corresponding to the number of copies. In the final recycling operation, a recovering operation is performed while feeding every other original from the intermediate tray.

b) A "second recovering operation", in which after first returning to a predetermined original, a recovering operation is performed in the above-described second image forming mode.

Conventionally, irrespective of the number of copies and the number of originals, the first recovery mode is selected in the case of a sheet jam in the first image forming mode, and the second recovery mode is selected in the case of a sheet jam in the second image forming mode. That is, the recovering mode corresponding to the image forming mode before a sheet jam is selected.

In the above-described image forming apparatus, since the first recovering mode or the second recovering mode is selected in accordance with the image forming mode before a sheet jam after the sheet jam has occurred, the productivity of the entire system will be in some cases reduced depending on the number of copies or the number of originals.

In order to overcome this problem, images may be formed always in the first recovering mode. However, recycling operations of originals will increase the possibility of damage to the originals, the occurrence of a sheet jam, and even rupture of originals.

SUMMARY OF THE INVENTION

It is an object of the present invention to provide an image forming apparatus in which originals are fed using an RDF, and an efficient operation can be performed when a plurality of duplex and/or multiplex composite copies are obtained.

The present invention which achieves the above-described objective has a feature of appropriately selecting a recovering image forming mode in accordance with the number of copies or the number of originals.

According to the above-described feature of the present invention, images can be output without reducing the productivity of the entire system while minimizing damage to originals.

In accordance with the above objects, there is provided an image forming apparatus comprising a recycling automatic original document feeder for automatically feeding a plurality of originals mounted on an original mount to an image reading position and for discharging the originals so as to be returned onto the original mount after the images of the originals have been read. The apparatus includes image reading means for reading the image of an original at the image reading position; image recording means for recording the image read by the image reading means on a recording medium; mode inputting means for inputting an image forming mode; copy-number setting means for setting a required number of image copies for each of the originals; recording-medium conveying means; and an intermediate tray for storing the recording medium after image formation, wherein, when the mode input by the mode inputting means is a single-sided original—duplex or multiplex image forming mode and the number of copies set by use of the copy-number setting means is a plurality of copies, one of first and second image forming modes are selectable, wherein, (1) in the first image mode there is a first recycling operation in which each original is recycled a plurality of times, an image is formed from every other original while the number of originals is counted, copies with formed images are stored in the intermediate tray, sheets of the recording medium are alternately fed for image formation from a recording-medium feeding unit and the intermediate tray in respective recycling operations from a second recycling operation up to a final recycling operation corresponding to the number of copies, and image formation is performed while feeding every other original from the intermediate tray in the final recycling operation, and (2) in the second image forming mode, image formation is performed while performing only one recycling operation, the apparatus further comprising: means for selecting switching between the first image forming mode and the second image forming mode; and original-number counting means, wherein, when a recovering operation is performed after a jam, one of the first image forming mode and the second image forming mode is selected in accordance with the number of originals counted.

In still another aspect of the invention there is providedd an image forming apparatus as described above wherein, when a recovering operation is performed after a jam, one of the first image forming mode and the second image forming mode is selected in accordance with the required number of remaining copies.

In yet another aspect of the invention there is provided an image forming apparatus as described above wherein, when a recovering operation is performed after a jam, one of the first image forming mode and the second image forming mode is manually selected.

These and other aspects of the invention will become even clearer in light of the following detailed description.

BRIEF DESCRIPTION OF THE DRAWINGS

FIGS. 11(A) and 11(B) are together plan view of the operation panel of the operation unit shown in FIG. 9, FIG. 11(A) being the left side view and FIG. 11(B) being the right side view;

DESCRIPTION OF THE PREFERRED EMBODIMENTS

Figure 1:
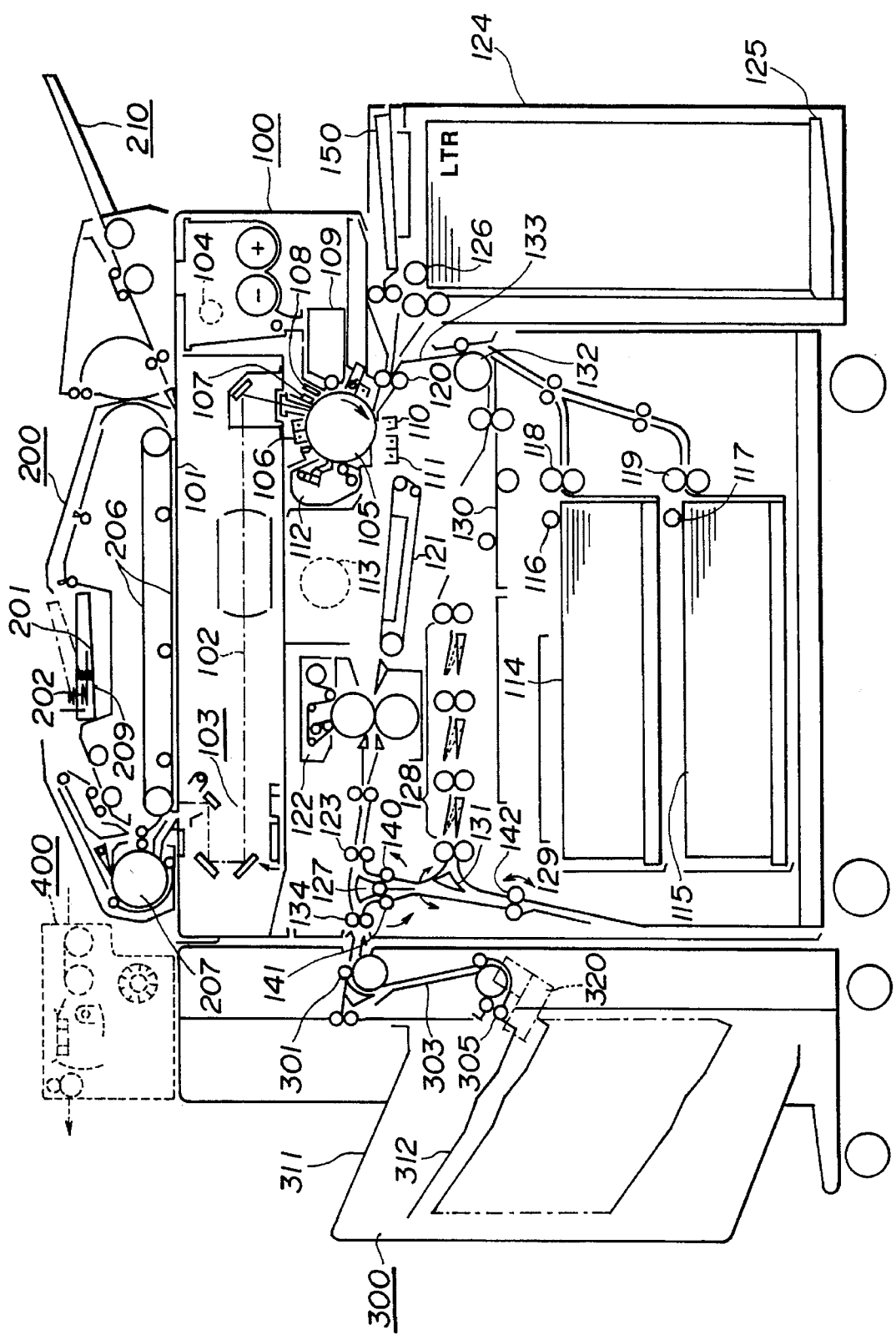
FIG. 1 is a diagram showing the schematic configuration of an image forming apparatus according to a preferred embodiment of the present invention.

FIG. 1 is a diagram showing the schematic configuration of an image forming apparatus according to a preferred embodiment of the present invention. The image forming apparatus of the present embodiment includes a main body 100 of the image forming apparatus having an image reading function and an image recording function, an RDF 200 for automatically feeding originals, a reservation original feeder (subfeeder) 210 for reserving the next original during image formation, a gathering unit 300 for stapling and sorting, a continuous-form feeder (CFF) 400 for automatically feeding a continuous form, such as a computer original or the like. The units 200, 210, 300 and 400 can be freely combined with respect to main body 100 of the image forming apparatus.

An explanation will now be provided of main body 100 of the image forming apparatus.

Main body 100 of the image forming apparatus of the present invention comprises an electrophotographic copier of a fixed-original-mount/moving-optical-system analog exposure and transfer type, and has the functions of forming duplex images (duplex-copying function) and of forming multiplex images (multiplex-copying function).

As used herein, an inputting mode of single-sided original-duplex is one in which one image copy is obtained from two originals by forming duplex images of the originals on two surfaces of a sheet of a recording medium. As used herein, a single-sided original-multiplex image forming mode is one in which multiplex images of the originals are formed on one surface of the sheet of the recording medium.

Main body 100 includes fixed original-mount glass (platen glass) 101 for mounting originals, optical path 102, moving imaging optical system 103 including an illuminating lamp (exposing lamp) for illuminating an original, toner sensor 104 for detecting the presence/absence of toner within a hopper, photosensitive drum 105, primary charger 106, blank exposure unit 107, potential sensor 108 for measuring the potential on the photosensitive drum, developing unit 109, transfer charger 110, separation charger 111, cleaning unit 112, and main motor 113 for driving the photosensitive drum and the like.

There are also shown upper deck 114, lower deck 115, multiple sheet manual-feeding port 150, and side deck 124, each serving as a recording-medium feeding unit. Reference numerals 116 and 117 represent sheet-feeding rollers and reference numerals 118, 119 and 120 represent registration rollers.

Conveying belt 121 conveys recording paper (transfer paper), serving as a recording medium, on which an image has been recorded, to fixing unit 122. Fixing unit 122 fixes the image on the conveyed recording paper with heat.

The surface of the above-described photosensitive drum 105 comprises a seamless photosensitive member made of a photoconductor and a conductor. Photosensitive drum 105 rotates in the direction of the arrow and is driven by main motor 113 operating in response to depression of a copystart key (to be described later). After the completion of a predetermined amount of rotation of photosensitive drum 105 and potential control processing (preprocessing), an original mounted on original-mount glass 101 is illuminated by the illuminating lamp formed integral with a first scanning mirror of optical system 103. Reflected light from the original is imaged onto photosensitive drum 105 after passing along optical path 102.

Photosensitive drum 105 is subjected to corona charging by primary charger 106. Thereafter, the image of the original illumiated by the illuminating lamp of optical system 103 is subjected to slit exposure, and an electrostatic latent image is formed on photosensitive drum 105 by any known process, such as the Carlson process.

Thereafter, the electrostatic latent image on photosensitive drum 105 is developed by a developing roller of developing unit 109 to be visualized as a toner image, which is transferred onto recording paper by transfer charger 110. That is, a sheet of recording paper, serving as a recording medium, within upper deck 114, lower deck 115 or side deck 124, each serving as a sheet feeding unit, or a sheet of recording paper set in multiple sheet manual-feeding port 150, is fed into the main body of the apparatus, and the leading end of the sheet is aligned with the leading end of the toner image on photosensitive drum 105 by registration rollers 120.

Thereafter, the sheet passes through a transfer portion provided between transfer charger 110 and photosensitive drum 105, whereby the toner image on photosensitive drum 105 is sequentially transferred onto the sheet.

The sheet on which the toner image has been transferred is separated from the surface of photosensitive drum 105, and is guided to fixing unit 122 by conveying belt 121. The image is fixed in fixing unit 122, and the sheet having the fixed image is discharged to stapling sorter 300 in the case of a simplex copying mode.

Photosensitive drum 105 continues to rotate after the image transfer, and the surface of photosensitive drum 105 is cleaned by cleaning unit 112, which includes a cleaning roller and an elastic blade.

Sheet discharging flapper 127 switches between a path for duplex recording, multiplex recording or reversal discharging and a path for discharging. Reference numeral 129 reprensents switchback rollers 129 for reversal discharging. Reversal sheet discharging flapper 131 switches between a path for duplex recording or multiplex recording and a path for reversal discharging, and guides the recording paper to switchback rollers 129.

Intermediate-tray sheet discharging flappers 128 rotate in accordance with the length of the paper. Transfer paper passing through sheet discharging flapper 127 is turned inside out by switchback rollers 129, and is accommodated within intermediate tray 130. Sheet feeding rollers 132 refeeds the recording paper toward photosensitive drum 105.

In a duplex copying (recording) operation, sheet discharging flapper 127 is upwardly moved and reversal sheet discharging flapper 131 is rotated in the rightward direction to guide the recording paper, on the first surface of which an image has been copied, to switchback rollers 129. After the recording paper has passed through reversal sheet discharging flapper 131, switchback rollers 129 are rotated in the reverse direction, and the recording paper is accommodated on intermediate tray 130 by intermediate-tray sheet discharging flappers 128. Intermediate tray 130 can accommodate, for example, a maximum 50 sheets of recording paper.

In a multiplex copying or recording operation, sheet discharging flapper 127 is upwardly moved and reversal sheet discharging flapper 131 is rotated in the leftward direction to accommodate the recording paper after the first copying operation on intermediate tray 130 by intermediate-tray sheet discharging flappers 128.

In a copying operation on the second surface or in the second copying operation, sheets of the recording paper accommodated on intermediate tray 130 are individually fed from the lowest sheet and are guided to registration rollers 120.

In a reversal sheet discharging operation, reversal sheet discharging flapper 131 is rotated in the rightward direction to guide the recording paper to switchback rollers 129. After the recording paper has sufficiently reached switchback rollers 129, switchback rollers 129 are rotated in the reverse direction to discharge the recording paper outside the apparatus by sheet discharging rollers 134.

Next, a description will be provided of RDF 200.

Figure 2:
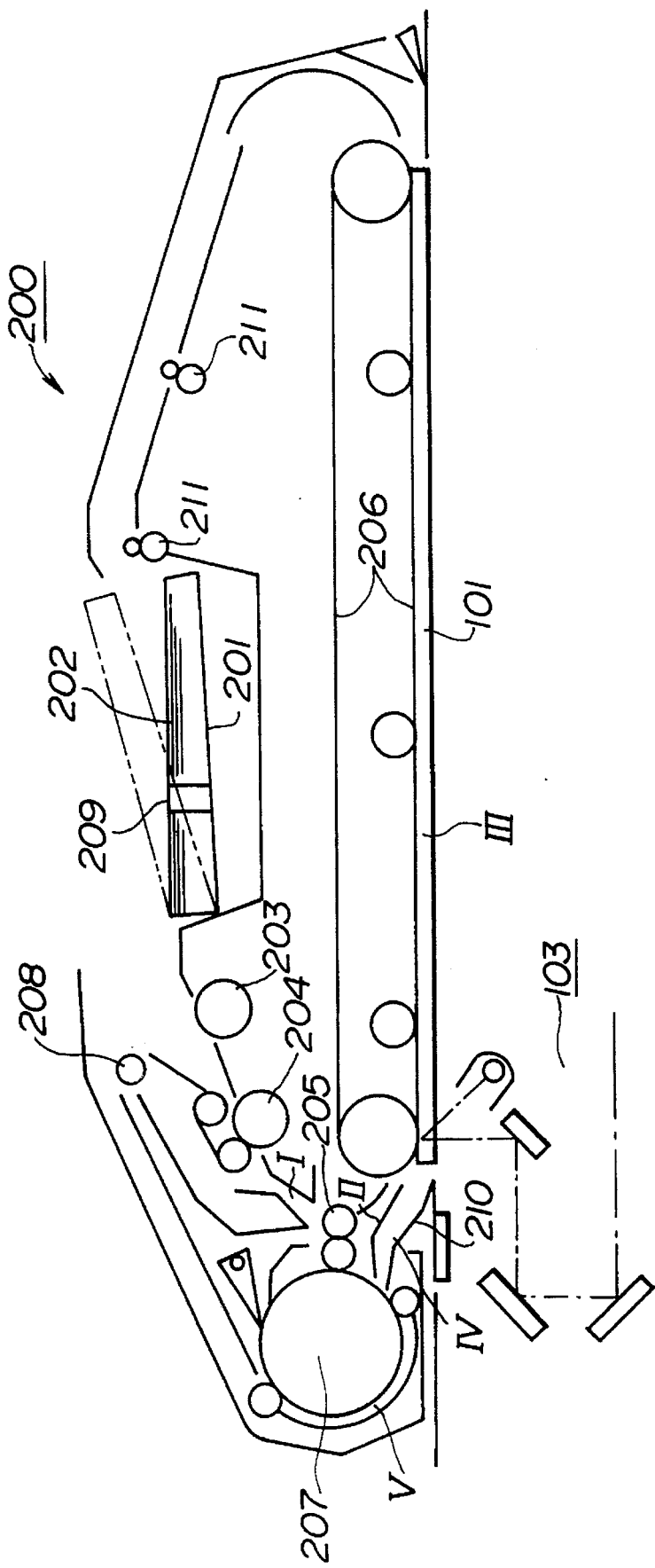
FIG. 2 is an enlarged view of the portion of an RDF of the apparatus shown in FIG. 1.

FIG. 2 is an enlarged view of RDF 200 shown in FIG. 1. In FIG. 2, mounting tray (original mount) 201 is used for setting a bundle of originals 202. In the case of single-sided originals, the originals are individually separated from the lowest original of bundle of originals 202 by semi-circular roller 203 and separation roller 204. Each of the separated originals is conveyed to and stopped at the exposure position on original-mount glass 101 by conveying rollers 205 and full-face belt 206. Thereafter, a copying operation is started. After the completion of the copying operation, the original on original-mount glass 101 is returned again to the uppermost surface of the bundle of originals 202 by large conveying roller 207 and sheet discharging roller 208.

Recycling lever 209 is used for detecting one recycling operation of originals. When starting to feed originals, recycling lever 209 is mounted on the surface of bundle of originals 202. When the originals have been sequentially fed and the rear end of the final original has passed through recycling lever 209, recycling lever 209 drops onto mounting tray 201 due to its own weight, whereby one recycling operation of the originals is detected.

In the case of double-sided originals, each original is first guided from paths I and II to path III. After the completion of a copying operation, the leading end of the original is guided to path IV by switching a guide 210. The original is conveyed thru path IV and path V by large conveying roller 207. The original is then reconveyed through path II by conveying rollers 205, and is further conveyed to and stopped on original-mount glass 101 by full-face belt 206. That is, by the rotation of large conveying roller 207, the original is reversed through the route of paths III–IV–V–II.

It is also possible to count the number of originals by individually conveying originals from the bundle of originals 202 through paths I–II–III–IV–V–VI until one recycling operation is detected by recycling lever 209.

In a discharging operation after the completion of a copying operation of small-size single-sided originals, the original on original-mount glass 101 is returned onto the uppermost surface of the bundle of originals 202 by full-face belt 206 and sheet discharging rollers 211.

Next, a description will be provided of stapling sorter 300, as illustrated in FIG. 1.

Stapling sorter 300 includes a fixed non-sorting tray 311 and tray 312 having 20 bins.

In a sorting mode, sheets of recording paper on which images have been copied (simplex copying, duplex copying or multiplex copying) are sequentially discharged from sheet discharging rollers 134 of main body 100 of the image forming apparatus, enter conveying rollers 301 of sorter 300, pass along conveying path 303, and are discharged in respective bins of tray 312 by discharging rollers 305 while respective bins are vertically moved by a bin-shifting motor (not shown). Thus, a gathering operation is performed. When a stapling mode has been selected and a stapling signal has been input from main body 100, stapling device 320 staples sheets in each bin as the bins are sequentially moved by the bin-shifting motor.

Next, a description will be provided of an operation panel.

Figure 3:
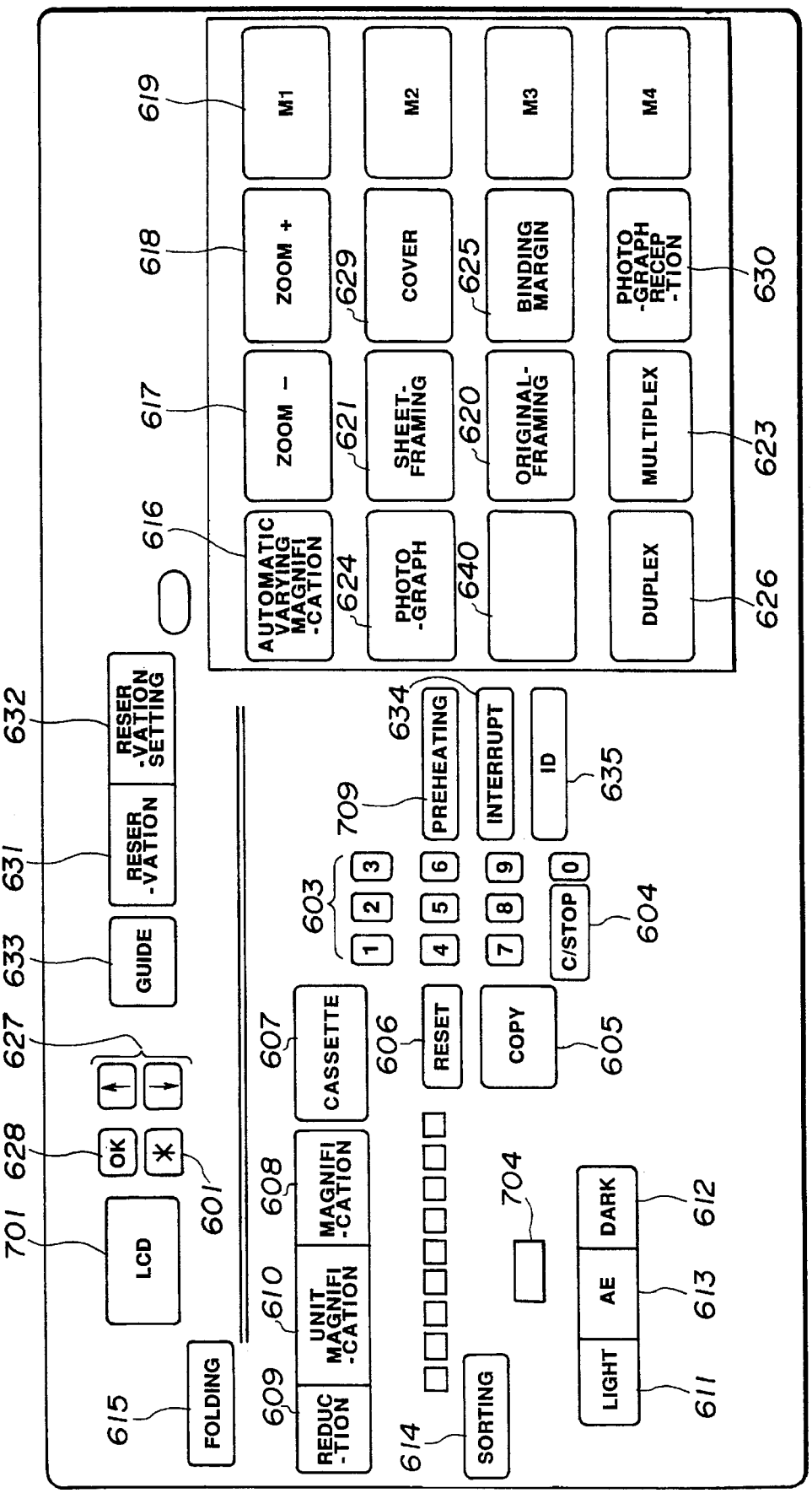
FIG. 3 is a plan view of an operation panel.

FIG. 3 is a plan view of an operation panel provided in main body 100 of the image forming apparatus.

In FIG. 3, asterisk (*) key 601 is used when the operator (user) sets the size of a binding margin, the size of framing of originals, and the like.

Reset key 606 is depressed when returning to a standard mode.

Copy-start key 605 is depressed when starting a copying operation.

Clear/stop key 604 functions as a clear key during a standby state, and as a stop key during a copying operation. The clear key is used also when releasing the set number of copies. The stop key is depressed when interrupting a continuous copying operation. After the completion of the copying operation being performed when the stop key has been depressed, the entire copying operation is stopped.

Ten keys 603 are used to set the number of copies, and are used also when setting an * (asterisk) mode.

The user can register modes which are frequently used through memory keys 619. Four kinds of modes, M1–M4, can be stored.

Copy density keys 611 and 612 are depressed when manually controlling the density of copies. AE key 613 is depressed when automatically adjusting the density of a copy in accordance with the density of an original, or when switching the density control to manual control by releasing AE (automatic density control).

Cassette selection key 607 is depressed when selecting one of upper deck 114, lower deck 115, side deck 124 and multiple sheet manual feeding port 150. When originals are mounted on RDF 200, APS (automatic paper-cassette selection) can also be selected through key 607. When the APS has been selected, the cassette having the same size as the size of originals is automatically selected.

Unit-magnification key 610 is depressed when obtaining copies of unit magnification (the original size).

Automatic varying magnification key 616 is depressed when assigning automatic reduction/magnification of the images of originals in accordance with the size of assigned recording paper.

Duplex key 626 is depressed when obtaining duplex copies from single-sided originals, duplex copies from double-sided originals, or simplex copies from double-sided originals.

Through binding-margin key 625, the user can provide a binding margin having the assigned length along the left edge of the recording paper.

Photograph key 624 is depressed when copying a photograph original.

Multiplex key 623 is depressed when forming (synthesizing) images on the same surface of recording paper from two originals.

Original-framing key 620 is depressed when the user performs framing of a format-size original. At that time, the size of the original is set using arrow keys 627 and OK key 628.

Sheet-framing key 621 is depressed when the user performs framing of originals in accordance with the size of the cassette.

Key 614 is used for selecting the sheet discharging method for stapling, sorting or grouping. When the stapler is connected, a stapling mode or a sorting mode can be selected, or the selected mode can be released. When the sorting tray (sorter) is connected, the sorting mode or a grouping mode can be selected, or the selected mode can be released.

Sheet-folding selection key 615 can select either Z-folding, in which A3- or B4-size sheets, on which images have been recorded, are folded in the form of a Z-like cross section, or semifolding, in which A3- or B4-size sheets, on which images have been recorded, are folded into halves. Sheet-feeding selection key 615 can also release the selection.

Reference numeral 701 represents an LCD (liquid crystal display)-type message display for displaying information relating to copying. Display 701 can display, for example, a message of 40 characters, each character comprising 64 dots in an 8×8 array, or a copying magnification set using format-changing key 608 or 609, unit-magnification key 610, or zoom key 617 or 618. Display 701 is made of a semi-transparent liquid crystal, and back light is provided for illuminating display 701.

AE display light 704 is lit when AE is selected through AE key 613.

Preheating display unit 709 is lit when obtaining duplex copies from double-sided originals, or duplex copies from single-sided originals.

When RDF 200 is used in the standard mode, the apparatus is set for one copy, for an AE mode of density, for automatic paper selection, for unit magnification, and for a simplex copy from a single-sided original.

When RDF 200 is not used in the standard mode, the apparatus is set for one copy, for a manual density mode, for unit magnification, and for a simplex copy from a single-sided original.

Whether or not RDF 200 is used is determined by whether or not originals are set in RDF 200.

Next, a description will be provided of image forming modes.

Figure 4:
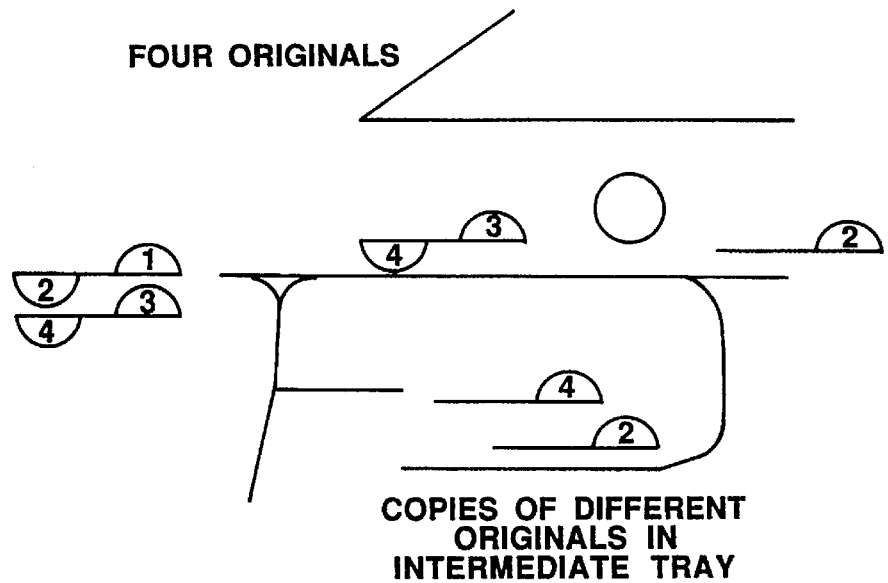
FIG. 4 is a diagram illustrating the operation of a first recovering mode.

FIG. 4 is a diagram illustrating the operation of a first image forming mode (an RDF mode). The first image forming mode is selected when the number of originals has a large value, and the number of copies has a small value.

In the RDF mode, if the number of originals is represented by N, images are formed while feeding to the image reading section every other original, N, N-2, N-4, . . . , from RDF 200, and feeding the sheets of the recording paper on which images have been copied on the first surfaces or the first copies have been provided, to intermediate tray 130. In this first recycling operation, it becomes clear whether the number of originals is odd or even.

In recycling operations from the second recycling operation to the final recycling operation, which corresponds to the number of copies. When the number of originals is even, sheets of the recording paper are fed from the cassette for originals, N, N-2, N-4, . . . , and conveyed to intermediate tray 130, while sheets are refed from intermediate tray 130 for originals, N-1, N-3, N-5, . . . . Images are formed on these fed sheets, and the sheets are then discharged.

When the number of originals is odd, sheets of the recording paper on which images have been formed in the first recycling operation are refed from intermediate tray 130, and image formation is not performed using overall erasure means by blank LED control.

When the number of originals is odd, the above-described reversal discharging operation is performed.

In the final recycling operation, image formation is performed in the same manner as for refed sheets from intermediate tray 130 from the second recycling operation to the recycling operation corresponding to the number of originals.

Figure 5:
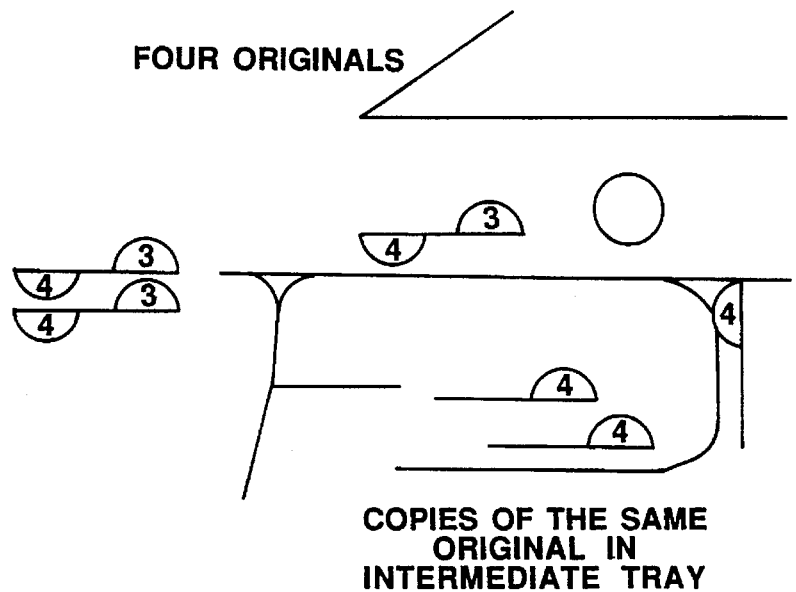
FIG. 5 is a diagram illustrating the operation of a second recovering mode.

FIG. 5 is a diagram illustrating the operation of a second image forming mode (an ADF mode) which is selected when the number of originals has a small value, and the number of copies has a large value.

In the ADF mode, first, the number of originals is counted by the RDF. If the result of the counting indicates an even number of originals, image formation is performed for the N-th original, while feeding the number of sheets from the cassette of recording paper corresponding to the number of copies to be made from the cassette, and the sheets, on which the first surfaces an image has been formed, or on which the first copying operation has been performed, are conveyed to intermediate tray 130.

Next, image formation is performed for the (N-1)-th original while feeding the sheets from intermediate tray 130, and then these sheets are discharged.

By repeating such an operation for the number of originals, image formation for the number of originals is performed.

When the number of originals is odd, the numer of sheets of recording paper corresponding to the number of copies to be made is fed from the cassette for the N-th original, and are conveyed to intermediate tray 130 without performing image formation using the overall erasure means by blank LED control.

Thereafter, image formation is performed for the N-th original while feeding the sheets from intermediate tray 130, and then the sheets are discharged.

Thereafter, image formation is performed for the (N-1)th original while feeding an amount of sheets of recording paper corresponding to the number of copies from the cassette, and then the sheets are conveyed to intermediate tray 130.

By repeating such an operation for the number of originals, image formation for the number of originals is performed.

To sum up, the criteria for selecting either the RDF mode or the ADF mode are as follows:

(1) When the number of originals has a large value, and the number of copies has a small value - - - RDF mode.

(2) When the number of originals has a small value, and the number of copies has a large value - - - ADF mode.

However, when the number of originals has an extremely small value - - - RDF mode.

(3) When the number of originals has a large value, and the number of copies has a large value - - - ADF mode.

(4) When the number of originals has a small value, and the number of copies has a small value - - - RDF mode. However, when the number of originals has an extremely small value - - - ADF mode.

Usually, the number of copies is known, but the number of originals is in many cases unknown. In such cases, the operator selects one of the above-described modes based on only the number of copies. That is, when the number of copies has a large value, the ADF mode is selected. When the number of copies has a small value, the RDF mode is selected.

In the RDF mode, since the number of copies is identified after one recycling operation of originals, the operator can know whether or not the selected mode is appropriate. However, the mode cannot be changed while a reading operation of the originals is performed. There is a chance when the operation is interrupted of the occurrence of a jam.

For example, the RDF mode is preferable if there is an extremely large number of originals while a copying operation has been performed in the ADF mode according to the above-described criterion (3) because the number of copies has a large value. On the other hand, the ADF mode is preferable if the number of originals has an extremely small value while the RDF mode has been selected because the number of copies has a small value. Such judgement may be performed also when the ADF mode or the RDF mode is automatically selected in accordance with the number of copies.

3) Recovering operation when a sheet jam has been detected

A description will be provided of the operations of the above-described first and second recovering modes when a sheet jam has been detected by recording-paper detection means.

First Recovering Mode

After removing the jammed sheet, the operation of returning to a predetermined original is performed in the first recycling operation. Thereafter, image formation is performed while a reading operation is performed for every other original, and the read originals are stored in the intermediate tray. In recycling operations from the second recycling operation to the recycling operation corresponding to the number of copies, after returning to the predetermined original, image formation is performed while reading originals and alternately feeding sheets from the sheet feeding cassette and the intermediate tray. In the final recycling operation, a recovering operation is performed with performing image formation while reading every other original and feeding sheets from the intermediate tray. Thereafter, image formation is performed in the same manner as in operations after the second recycling operation in the RDF mode.

Second Recovering Mode

In the ADF recovering operation, after first performing the operation of returning to a predetermined original, image formation is performed in the same manner as in the above-described case of the ADF mode.

The above-described RDF recovering mode or ADF recovering mode is selected in accordance with the number of copies and the number of originals.

Recovering Operation First in the ADF Mode and then in the RDF Mode

In this case, all copy sheets within the intermediate tray are discharged in the ADF recovering mode, and the RDF recovering mode is newly applied to the remaining copies. For example, when obtaining ten copies from originals having pages 1–15, a copying operation of ten copies is performed in the ADF mode for pages 1 and 2, and a copying operation of ten copies is performed in the RDF mode for the remaining pages 3–15.

Recovering Operation First in the RDF Mode and then in the ADF Mode

In this case, all copy sheets within the intermediate tray are discharged in the RDF mode, and the ADF recovering mode is newly applied to the remaining number of copies. For example, when obtaining five copies from originals having pages 1, 2, 3 and 4, a copying operation of two copies is performed in the RDF mode for pages 1, 2, 3 and 4, and a copying operation of three copies is performed in the ADF mode for pages 1, 2, 3 and 4.

Figure 6:
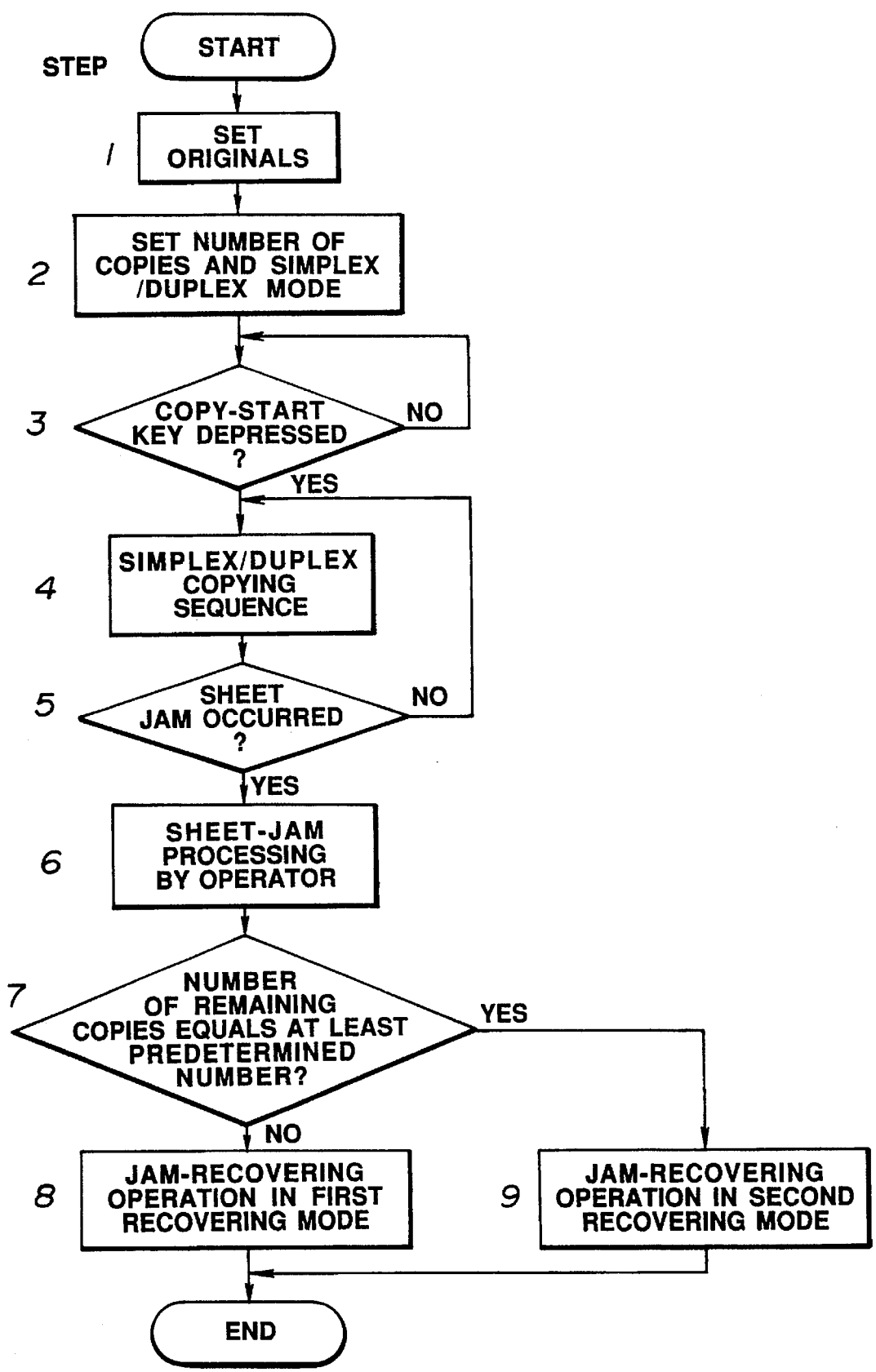
FIG. 6 is a flowchart illustrating a first example of the recovering operation when a jam has occurred in a double-sided sheet.

FIG. 6 is a flowchart illustrating a first example of the recovering operation when a jam of a double-sided sheet has occurred. This approach is effective when the operator manually selects a mode based on the number of copies and the selection is wrong.

First, originals are set in RDF 200 (step 1). Then, the number of copies and the simplex/duplex mode are set (step 2), the copy-start key is depressed (step 3), and the simplex/duplex copy (single-sided original—duplex image formation) sequence is started (step 4).

In the simplex/duplex copy sequence in step 4, the number of remaining copies is always monitored.

In parallel with the simplex/duplex copy sequence in step 4, it is determined whether or not a sheet jam has occurred (step 5).

If the result of the determination in step 5 is negative, the simplex/duplex copy sequence of step 4 is continued.

If the result of the determination in step 5 is affirmative, after sheet-jam processing by the operator (step 6), it is determined whether or not the number of remaining copies monitored in step 4 equals at least a predetermined number (step 7). The predetermined number equals, for example, the number of sheets of recording paper which can be accommodated along the conveying path from registration rollers 120 to intermediate tray 130.

If the result of the determination in step 7 is negative, image formation is performed in the above-described first recovering mode (step 8). If the result of the determination in step 7 is affirmative, image formation is performed in the above-described second recovering mode (step 9).

Figure 7:
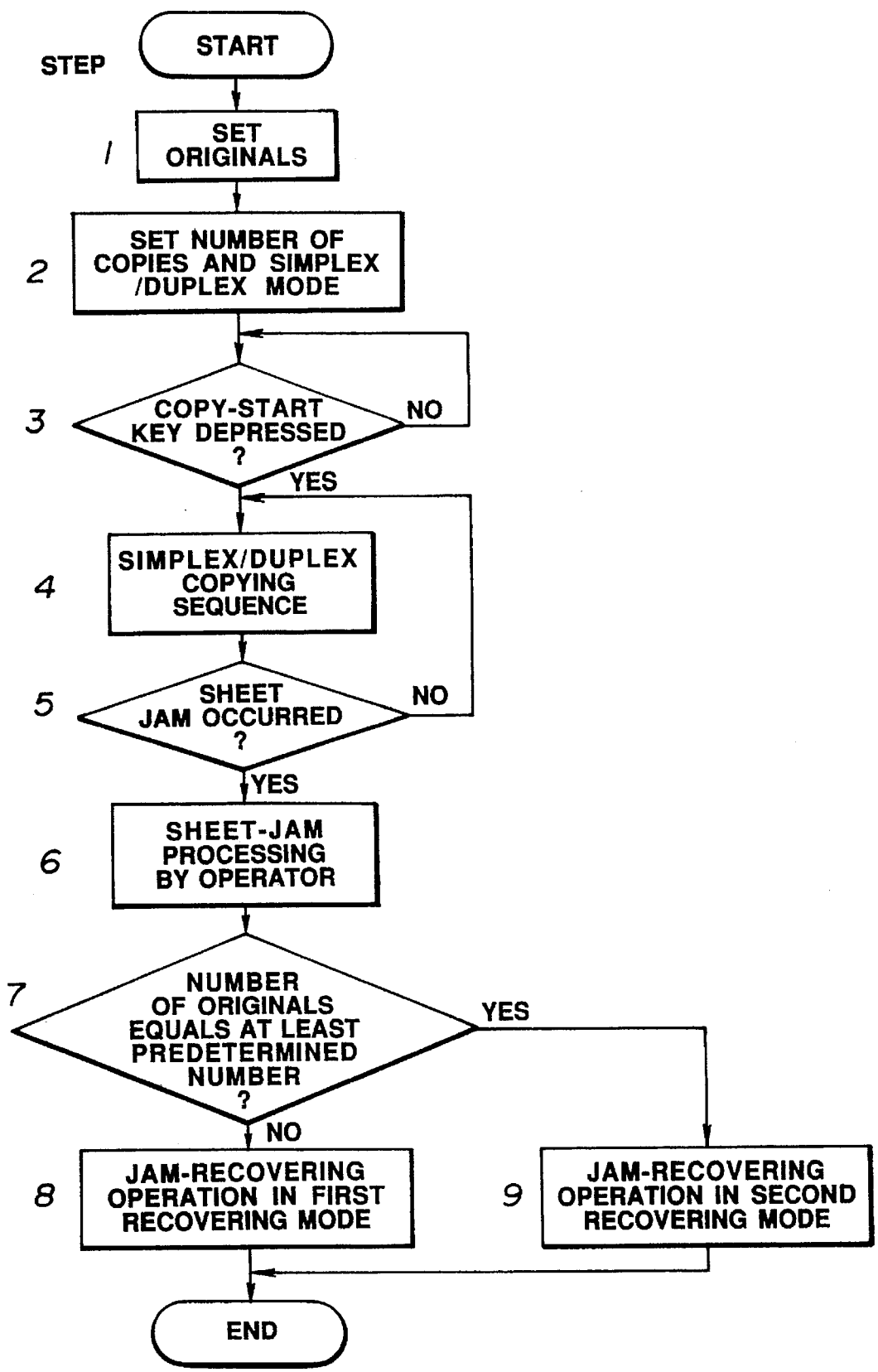
FIG. 7 is a flowchart illustrating a second example of the recovering operation when a jam has occurred in a double-sided sheet.

FIG. 7 is a flowchart illustrating a second example of the recovering operation when a jam of a double-sided sheet has occurred. This approach is effective when a mode is selected based on the number of copies and thereafter the number of originals becomes clear.

Steps 1–6 are the same as the above-described steps 1–6 shown in FIG. 6.

After the sheet jam processing in step 6, it is determined whether or not the number of originals monitored in step 4 equals at least a predetermined number of originals (step 7). The predetermined number equals, for example, twice a predetermined number of copies minus one.

If the result of the determination in step 7 is affirmative, image formation is performed in the above-described first recovering mode (step 8). If the result of the determination in step 7 is negative, image formation is performed in the above-described second recovery mode (step 9).

Figure 8:
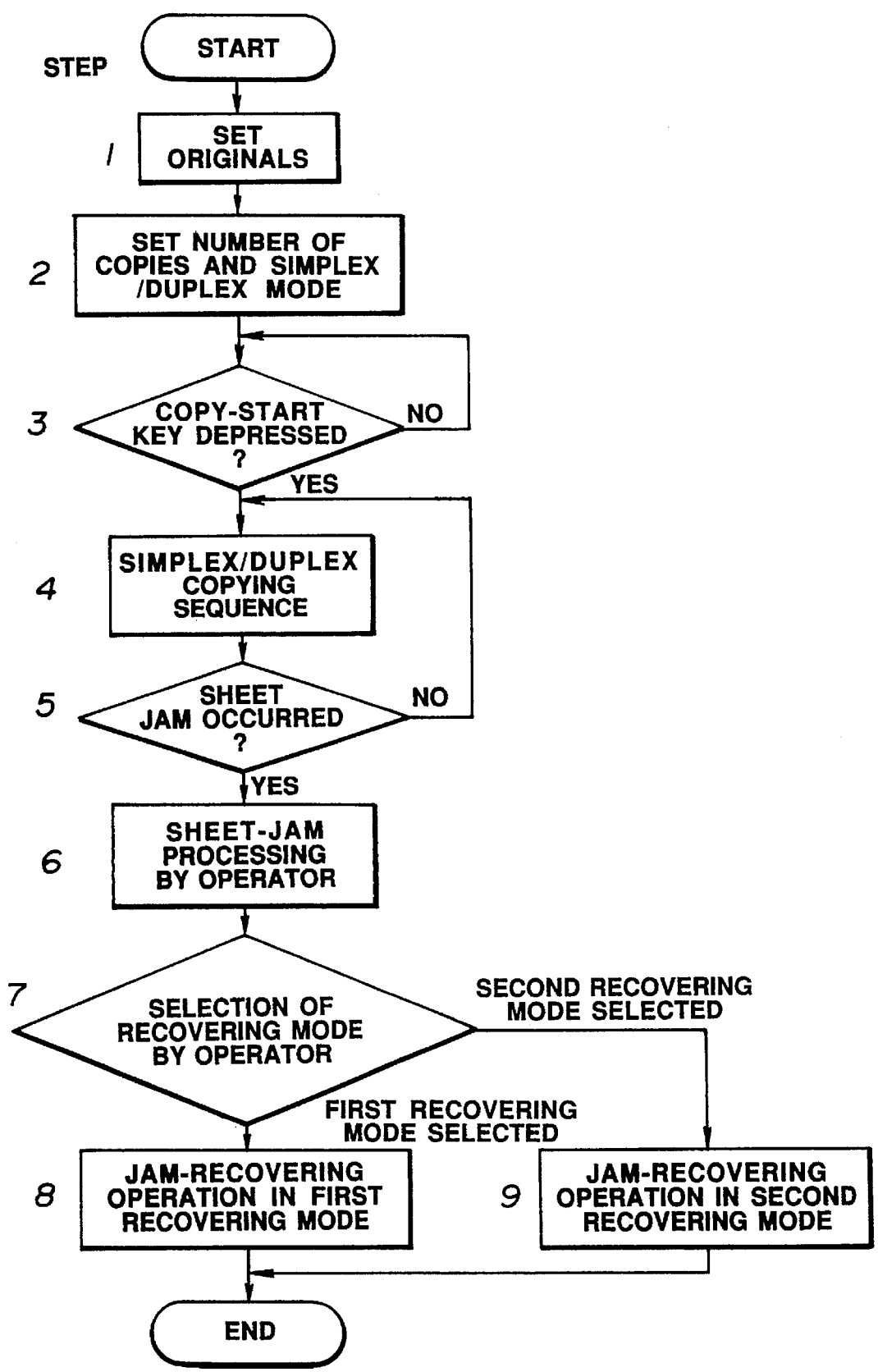
FIG. 8 is a flowchart illustrating a third example of the recovering operation when a jam has occurred in a double-sided sheet.

FIG. 8 is a flowchart of a third example of the recovering operation when a jam of a double-sided sheet has occurred.

Steps 1–6 are the same as the above-described steps 1–6 shown in FIG. 6.

After the sheet-jam processing in step 6, the operator selects the first or second recovery mode (step 7). For example, the first and second recovery modes are displayed on LCD 701 (FIG. 3), and the operator makes the selection using arrow keys 627.

When the operator has selected the first recovering mode in the determination of step 7, image formation is performed in the above-described first recovering mode (step 8). When the operator has selected the second recovering mode in the determination in step 7, image formation is performed in the above-described second recovery mode (step 9).

As described above, when a sheet jam has occurred in the single-sided original—duplex copy mode, in which one copy is obtained from two single-sided originals by forming images of the originals on two surfaces of recording paper using RDF 200, one of the above-described first recovering mode (RDF mode) and the second recovering mode (ADF mode) is selected in accordance with the number of originals and the number of copies. Thus, it is possible to provide an image forming apparatus which recovers from a sheet jam interruption without reducing the productivity of the entire apparatus and without damaging originals by reducing the number of recycling operations of the originals.

Second Embodiment (FIGS. 9–18)

In an apparatus according to a second embodiment of the present invention, the order of image formation of originals is automatically changed based on binding conditions.

(A) Image Forming Apparatus

Figure 9:
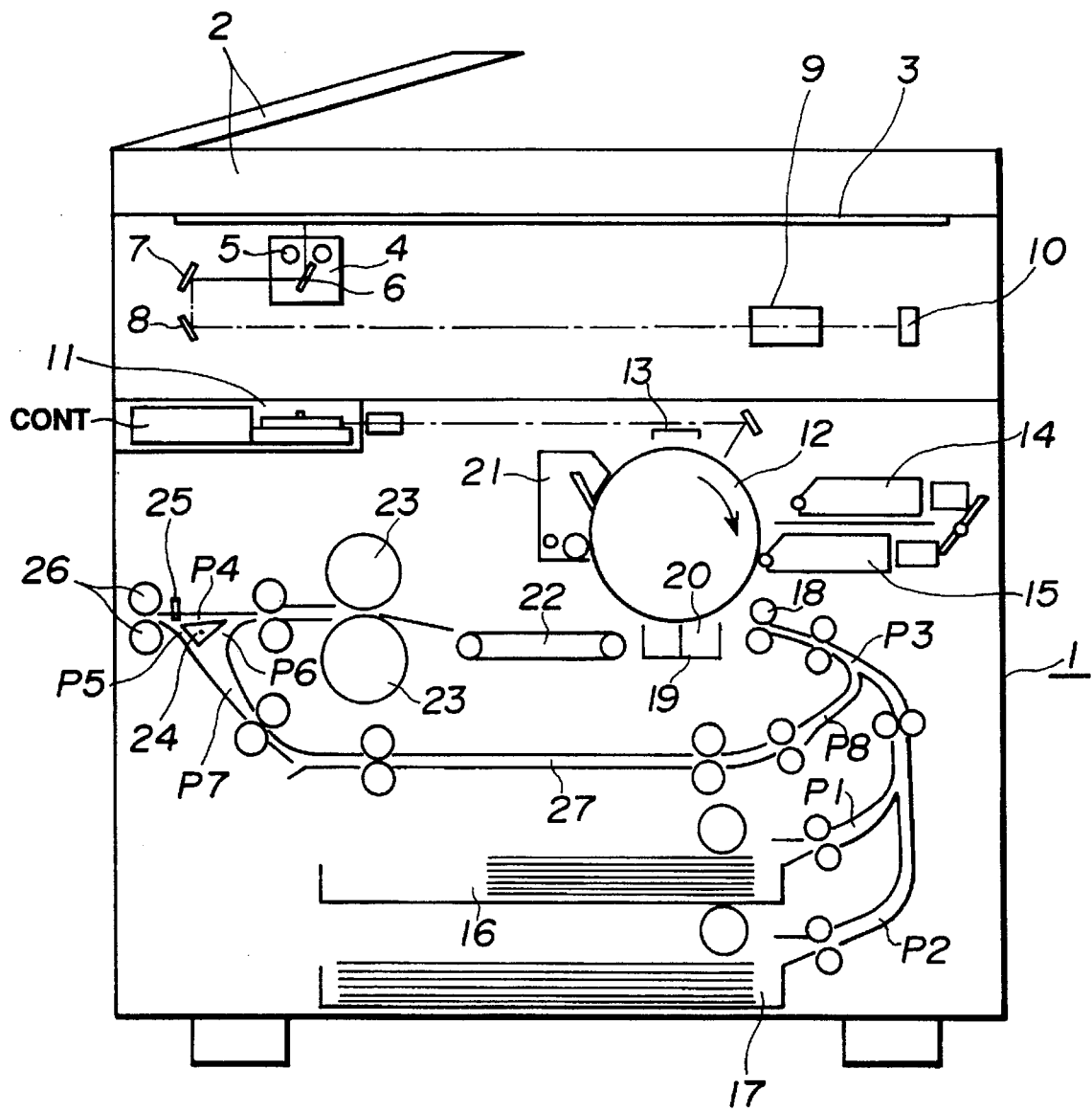
FIG. 9 is a diagram showing the schematic configuration of an image forming apparatus, in which the order of image formation of originals is automatically changed in accordance with binding conditions, according to another preferred embodiment of the present invenition.

FIG. 9 is a diagram showing the schematic configuration of the image forming apparatus of the present embodiment. The image forming apparatus of the present embodiment comprises an electrophotographic copier (printer) of a fixed-original-mount/moving-optical-system digital and transfer type, and has a function of forming forming duplex images (duplex-copying function) and a function of forming multiplex images (multiplex-copying function).

Reference numeral 1 represents the main body of the copier, and reference numeral 2 represents an RDF, capable of refeeding sheets, disposed on the main body of the apparatus. RDF 2 sequentially feeds originals mounted on the apparatus to a predetermined position on the surface of original-mount glass 3.

The original is fed to and set face-down on the surface of original-mount glass 3 where it is subjected to sequential optical scanning from one side to the other side by moving scanning optical system 4, comprising illuminating lamp 5, scanning mirrors 6–8, imaging lens 9 and the like, to be imaged onto image sensor unit 10, where image information of the original is photoelectrically read as a time-serial electric digital pixel (picture element) signal. The above-described units 5–10 constitute an image reading unit.

Exposure control unit 11, comprising a laser scanner, projects a light beam modulated in accordance with photoelectrically-read image data (a video signal) of the above-described image sensor unit 10 output from image signal control unit 43 (FIG. 10) of controller unit CONT onto rotating photosensitive member 12.

Charger 13 performs uniform primary charging processing of the surface of rotating photosensitive member 12 to a predetermined polarity and potential. As a result of this charging processing and the above-described scanning exposure by the light beam, an electrostatic latent image corresponding to the original-image is formed on the surface of rotating photosensitive member 12.

The latent image is subjected to toner development in a predetermined color by first developing unit 14 or second developing unit 15.

On the other hand, each sheet of recording paper (transfer paper in the form of a cut sheet), serving as a recording medium, is separated and fed from first sheet feeding unit (sheet cassette) 16 or second sheet feeding unit 17, passes along sheet path P1 or P2 and sheet path P3, and through a pair of registration rollers 18. The recording paper is then is fed to transfer position 20 between photosensitive member 12 and transfer/separation charger 19 at a predetermined timing (aligned with the leading end of the image), and the toner image on the surface of photosensitive member 12 is sequetially transferred onto the surface of the recording paper.

The recording paper, on which the toner image has been transferred, is separated from the surface of photosensitive member 12, and is guided between fixing rollers 23 by conveying unit 22. The transferred image is fixed by fixing rollers 23.

Reference numeral 21 represents a cleaning unit for the surface of photosensitive member 12 after the toner image has been transferred onto the recording paper.

In the case of the simplex recording (copying) mode, the recording paper leaving fixing unit 23 passes along sheet path P4 above direction-switching flapper 24, and is discharged to outside the apparatus by discharging rollers 26. Recording-paper sensor 25 is disposed near discharging rollers 26.

In the case of the duplex recording (copying) mode or the multiplex recording (copying) mode, the recording paper is guided to a refeeding mechanism including intermediate tray 27.

That is, in the case of duplex recording, the recording paper, on the first surface of which an image has been copied, leaving fixing unit 23 is conveyed along sheet path P4 and through discharging rollers 26. When the rear end of the recording paper is detected by sensor 25, the direction of flapper 24 is switched, and discharging rollers 26 are rotated in the reverse direction, whereby the recording paper is subjected to a switchback operation and is guided thru sheet paths P5 and P7 to intermediate tray 27. In this case, the recording paper is guided within intermediate tray 27 so that the first surface is in a face-up state.

The recording paper guided into intermediate tray 27 is fed along sheet paths P8 and P3, and through the pair of registration rollers 18 to transfer position 20, where another toner image is transferred onto the second surface of the recording paper. The recording paper then passes through conveying unit 22 and fixing rollers 23, along sheet path P4 and through discharging rollers 26, and is discharged outside the apparatus as a duplex copy.

In the case of multiplex recording, the recording paper after the first copying operation leaving fixing unit 23 is guided to sheet path P6 by direction-switching flapper 24, and is guided along sheet path P7 to intermediate tray 27. In this case, the recording paper is guided within intermediate tray 27 so that the surface subjected to the first copying operation is in a face-down state.

The recording paper guided into intermediate tray 27 is fed along sheet paths P8 and P3, and through the pair of registration rollers 18 to transfer unit 20, then passes through conveying unit 22 and fixing rollers 23, along sheet path P4, and through discharging rollers 26, and is discharged outside the apparatus as a multiplex copy.

The above-described components 11–27 constitute a printer unit.

Figure 10:
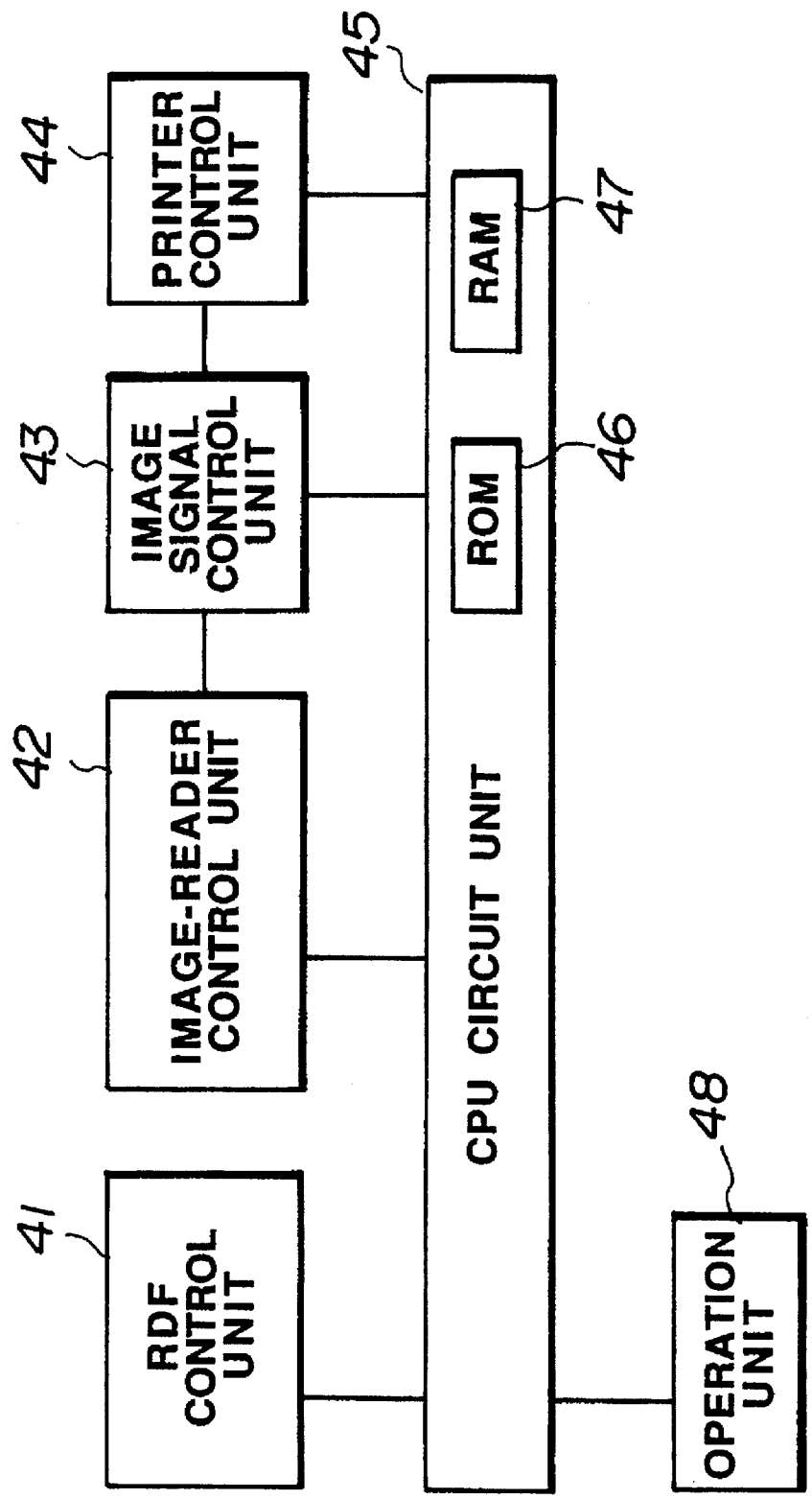
FIG. 10 is a block diagram of circuitry of the control system shown in FIG. 9.

FIG. 10 is a block diagram of a control system of the apparatus. In FIG. 10, CPU circuit unit 45 incluces ROM 46 and RAM 47, and performs multiple control of the respective units according to control programs stored in ROM 46.

Reference numeral 41 represents a control unit for RDF 2. Image-reader control unit 42 outputs a photoelectrically-converted analog image signal to image-signal control unit 43.

Printer control unit 44 drives the laser scanner of exposure control unit 11 in accordance with a video signal output from image-signal control unit 43.

That is, an image signal input to image sensor 10, i.e., an input signal from the reader unit, reaches printer control unit 44 after being processed by image-signal control unit 43 under the control of CPU 45. Then, the signal is converted into an optical signal (a light beam) by exposure control unit 11 to illuminate photosensitive member 12 in accordance with the image signal.

Operation unit 48 includes a scanning panel having keys, display units and the like for setting modes necessary for image formation.

In the digital copier having the above-described configuration, when original-counting means provided in RDF 2 has counted the number of originals, changing means (in this embodiment, CPU 45 also functions as this means) changes the copying order of the originals mounted on RDF 2 based on the counted number of originals. Control means (in this embodiment, image-signal control unit 43) controls the transfer of original-image information read by the image reader in accordance with the changed copying order, and sequentially outputs respective contents of original-image information read in the changed original-feeding order onto two surfaces of respective sheets of the recording medium.

The changing means sequentially outputs respective contents of original-image information onto two surfaces of respective sheets of the recording paper while changing the original-feeding order in accordance with binding conditions of the recording paper to be output.

Furthermore, the changing means sequentially outputs respective contents of original-image information onto two surfaces of respective sheets of the recording paper while automatically changing the original-feeding order so that sheets of the recording paper provide normal continuous pages when folded in halves.

FIGS. 11(A) and (B) are a plan view of operation panel 50 of operation unit 48.

In FIG. 11, power-supply switch 51 controls power supply to the image forming apparatus. Reset key 52 is used for returning the mode to the standard mode in a standby state. Reference numeral 53 represents a copy key. Ten keys 55 are mainly used for inputting the number of copies. Reference numeral 57 represents a key to select sheet cassette 16 or 17. Reference numeral 64 represents a key to set a binding margin at one end of the recording paper. Mode-assigning key 66 is depressed when assigning a binding output mode in duplex output.

Multiplex key 70 is used to select the multiplex mode. Continuous-copying key 71 is used to select a continuous copying operation in which the copying region on the surface of original-mount glass 3 is divided into right and left portions, and the images of two originals on the two portions are automatically copied. Reference numeral 72 represents a key to select the duplex copying mode. Reference numerals 73 and 74 represent keys to instruct the operation of a sorter (not shown).

Mode memory keys 77, 78 and 79 are used to store the set copying modes. Three kinds of copying modes, $M_1$–$M_3$, can be stored.

Liquid-crystal display unit 80 displays the number of copies, recording paper, set magnification, a message and the like. Display unit 80 comprises a liquid-crystal display element. Reference numerals 81–92 represent LED (light-emitting diode) display units. LED display unit 81 performs display when the sorter is used, and displays a sorting mode, a grouping mode or the like.

(B) Page-rearranging processing in the case of duplex output

A description will now be provided of page-rearranging processing in the case of duplex output for original-images to be copied with reference to FIGS. 12(a) through 14.

FIGS. 12 (a) through 12(d) are schematic diagrams illustrating the flow of page-rearranging processing in the case of duplex output.

Figure 12A:
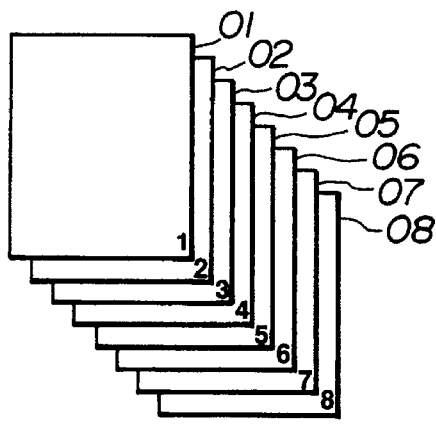
FIGS. 12(a), 12(b), 12(c), and 12(d) are schematic diagrams illustrating the flow of page-rearranging processing in the case of duplex output.
Figure 12B:
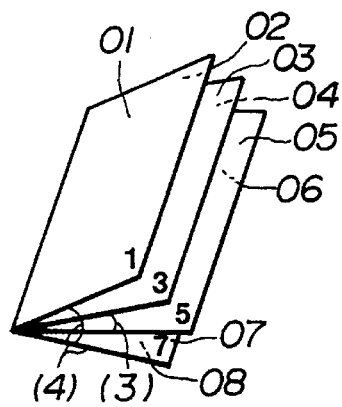
Figure 12C:
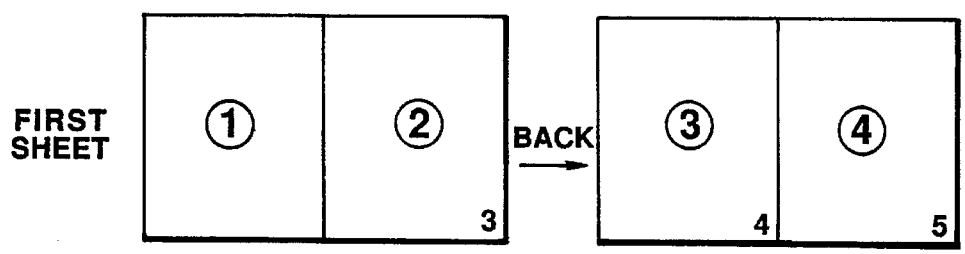
Figure 12D:
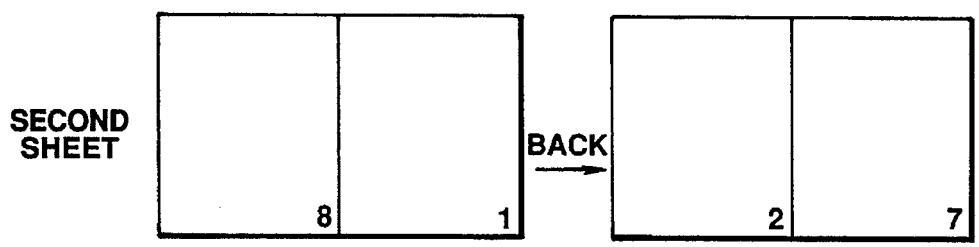

FIG. 12(a) illustrates input originals 01–08, which are set in RDF 2. FIG. 12(b) illustrates the bound copies in duplex output. FIGS. 12(c) and 12(d) illustrate states of allocating pages on the first and second sheets of recording paper, respectively. In FIG. 12(c), numerals (1)–(4) indicate the order of image transfer. In FIGS. 12(c) and 12(d), numerals 1–8 on the lower right corners correspond to the input originals 01–08 shown in FIG. 12(a), respectively.

Figure 13:
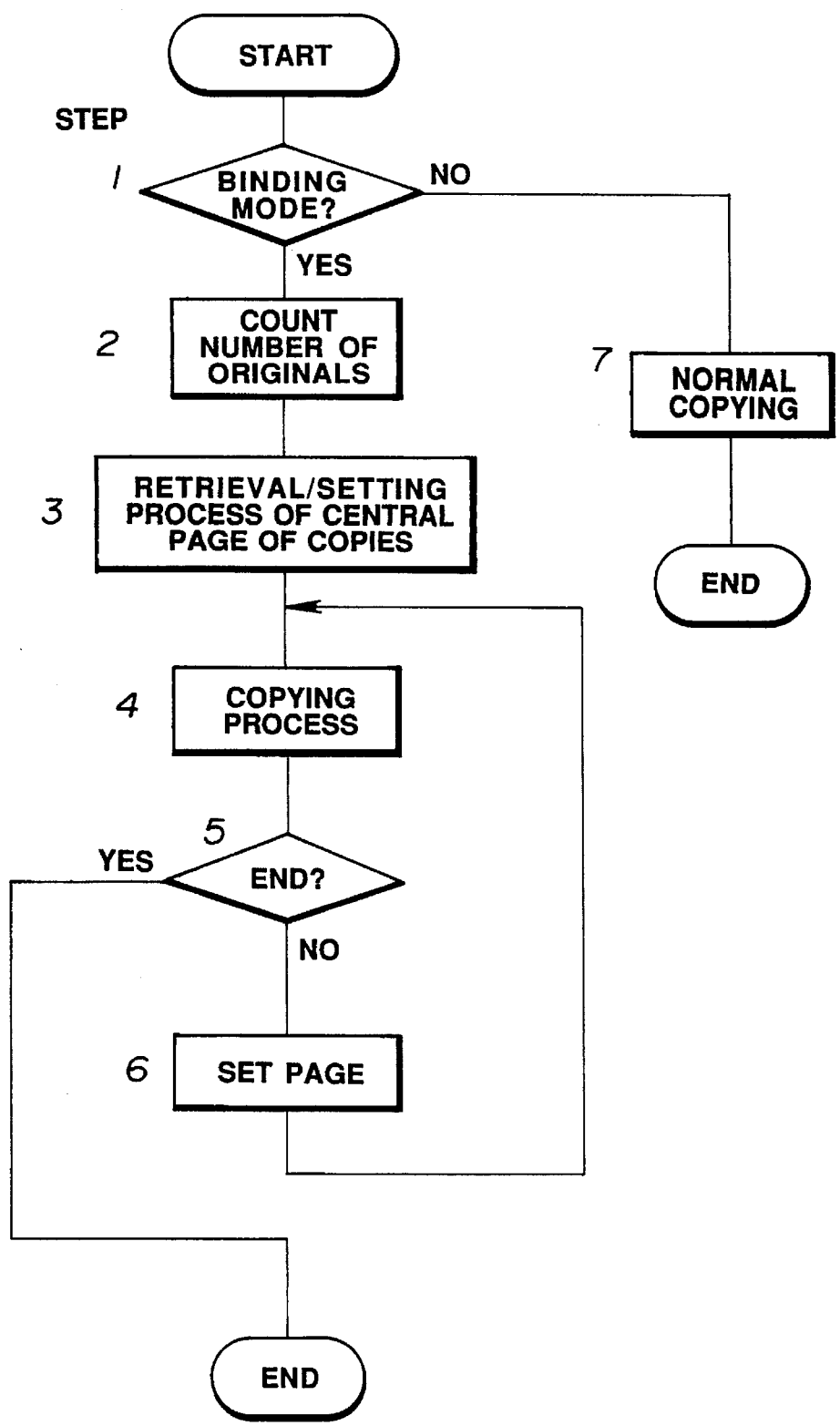
FIG. 13 is a flowchart illustrating a binding-mode processing procedure.

FIG. 13 is a flowchart illustrating a procedure for binding-mode processing.

First, when input originals 01–08 have been set in RDF 2 and copy-start key 53 has been depressed, the flow starts, and it is determined whether or not a binding mode has been set through mode-assigning key 66 (step 1). If the result of the determination is negative, a normal copying operation is executed (step 7), and the process is terminated.

If the result of the determination in step 1 is affirmative, the number N of originals mounted on RDF 2 is counted (step 2). After counting the number N, the arrangement of images to be copied on the innermost sheet S1 of recording paper shown in FIG. 12(b), that is, the arrangement of pages to be output to positions of the order of image transfer (1)–(4) shown in FIG. 12(c), is obtained according to retrieval/setting processing shown in the flowchart of FIG. 14 (step 3).

Figure 15:
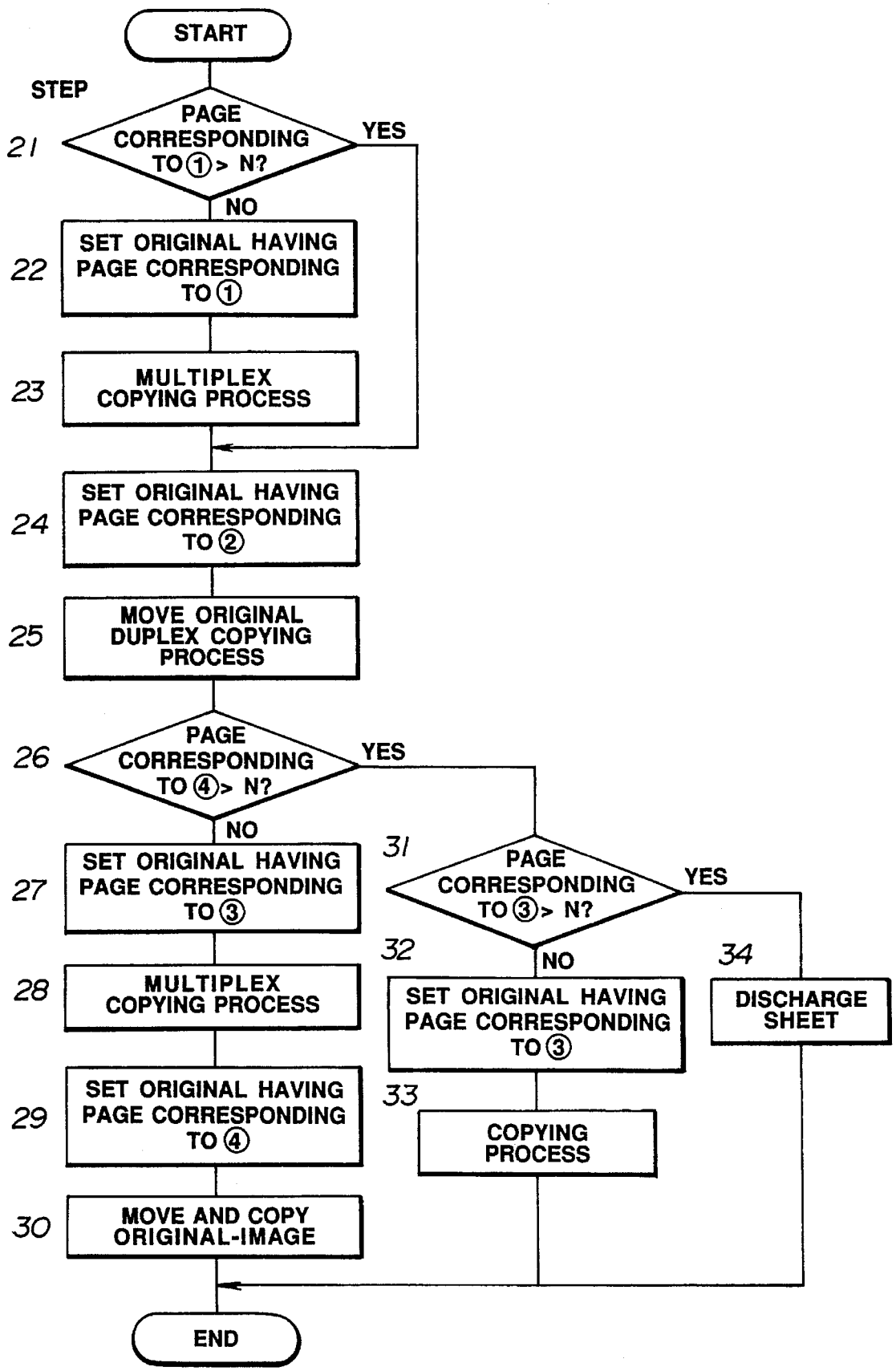
FIG. 15 is the flowchart of a copy process routine.
Figure 16:
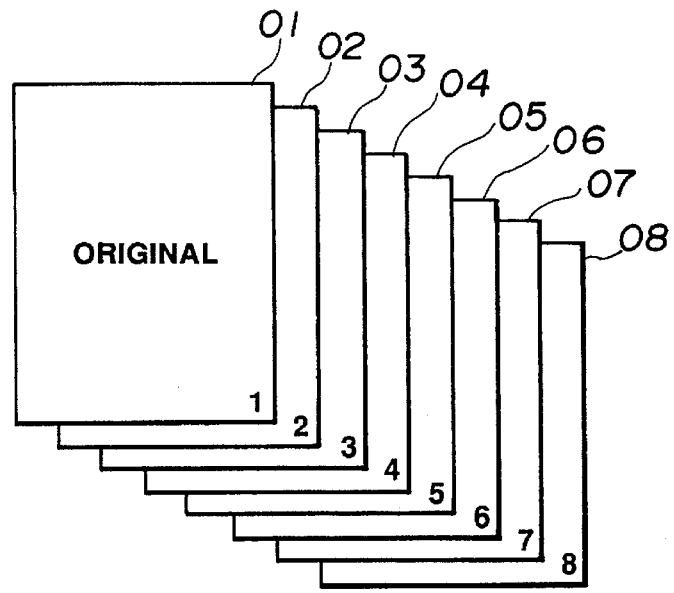
FIGS. 16(a) and 16(b) are schematic diagrams illustrating the flow of page-rearranging processing in the case of duplex output.
Figure 16:
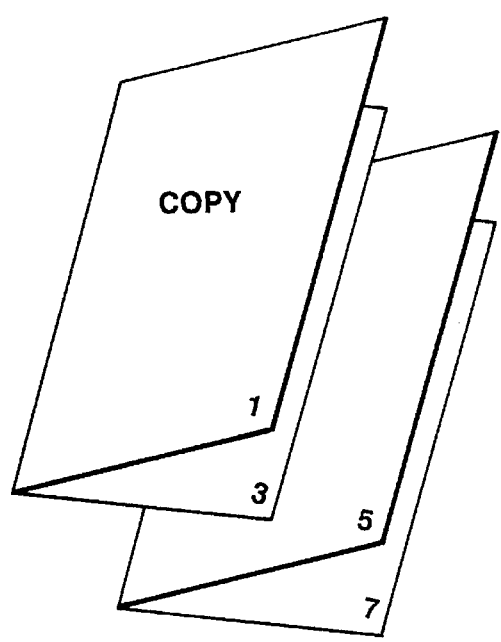

Thereafter, the copy process routine shown in FIG. 15 is started in accordance with the obtained data of pages (step 4).

Next, a description will be provided of the copying process routine shown in FIG. 15. FIG. 15 is a flowchart illustrating a detailed procedure for the copying process routine shown in step 4 in FIG. 13.

First, the page to be copied in the image transfer order (1) is compared with the number N of originals (the page of the final original) to determine whether or not the value of the page to be copied in the image transfer order (1) is greater than the number N of originals (step 21). If the result of the determination is affirmative, the process proceeds to step 24 (to be described later). (In this case, there is no original to be copied in the image transfer order (1).)

If the result of the determination in step 21 is negative, the process proceeds to step 22. (In this case, there is an original to be copied in the image transfer order (1).) In step 22, the original having the page to be copied in the image transfer order (1) is set on original-mount glass 3.

Thereafter, a mode is set so that the original-image is copied on position (1) shown in FIG. 12(c) in the multiplex-copying mode, and a copying operation is started. The original-image read by image-reader control unit 42 (FIG. 10) is processed so as to be output on the set image-output position by image-signal control unit 43, and the processed signal is transmitted to printer control unit 44 to form a latent image. After developing the latent image, the developed image is transferred onto recording paper and the transferred image is fixed. Thereafter, multiplex control is performed to copy the image of page (2) on the right side of the same surface of the recording paper, and the recording paper is stored in intermediate tray 27 (FIG. 9) (step 23).

Thereafter, in step 24, the original having the page to be copied in the image transfer order (2) is set on original-mount glass 3. Thereafter, a mode is set so that the original-image is copied on position (2) shown in FIG. 12(c) of the output paper (the above-described paper stored in intermediate tray 27) in the duplex-copying mode, and a copying operation is started.

Similarly, after forming the images on the first surface of the paper, the paper is stored in intermediate tray 27 in order to copy the images of pages (3) and (4) on the back of the paper (step 25).

Thereafter, the page to be copied in the image transfer order (4) is compared with the number N of originals (the page of the final original) to determine whether or not the value of the page to be copied in the image transfer order (4) is greater than the number N of originals (step 26). If the result of the determination is affirmative, the process proceeds to step 31. (In this case, there is no original to be copied in the image transfer order (4).)

If the result of the determination in step 26 is negative, the process proceeds to step 27. (In this case, there is an original to be copied in the image transfer order (4).) In step 27, the original having the page to be copied in the image transfer order (3) is set on original-mount glass 3 (step 27).

Thereafter, a mode is set so that the original-image is copied on position (3) shown in FIG. 12(c) of the output paper in the multiplex-copying mode, the paper stored in intermediate tray 27 is fed, and a copying operation is started.

After forming the image on the paper in the above-described manner, multiplex control is performed to copy the image of page (4) on the right side of the same surface of the paper, and the paper is stored in intermediate tray 27 (step 28).

Then, in step 29, the original having the page to be copied in the image transfer order (4) is set on original-mount glass 3. Thereafter, a mode is set so that the original-image is copied on position (4) shown in FIG. 12(c) of the output paper (the above-described paper stored in intermediate tray 27), and a copying operation is started. After forming the image on the paper in the same manner as described above, the paper is discharged (step 30).

In step 31, the page to be copied in the image transfer order (3) is compared with the number N of originals (the page of the final original) to determine whether or not the value of the page to be copied in the image transfer order (3) is greater than the number N of originals. If the result of the determination is affirmative, the process proceeds to step 34 and the sheet is discharged from intermediate tray 27 (step 34). (In this case, there is no original to be copied in the image transfer order (3).)

If the result of the determination in step 31 is negative, the process proceeds to step 32. (In this case, there is an original to be copied in the image transfer order (3).) In step 32, the original having the page to be copied in the image transfer order (3) is set on original-mount glass 3 (step 27).

Thereafter, the multiplex-copying mode is set for copying the original-image on position (3) shown in FIG. 12(c) of the output paper, the paper stored in intermediate tray 27 is fed, and a copying operation is started. After forming the image on the paper in the above-described manner, the paper is discharged (step 33).

Next, in step 5 shown in FIG. 13, it is determined whether or not all of the originals have been copied. If the result of the determination is affirmative, the process is terminated. If the result of the determination is negative, copy pages (1) through (4) are set according to the following expression (1) in order to set the next page to be copied (step 6). After the setting, the process returns to step 4.

Expression (1):

(1)=(1)+2

(2)=(2)−2

(3)=(3)−2

(4)=(4)+2.

After the completion of the copy process in the binding mode in the above-described manner, duplex-output sheets are folded with respect to the center of the respective sheets, and are bound as shown in FIG. 12(b) to provide a state in which pages are arranged in the normal order.

Figure 14:
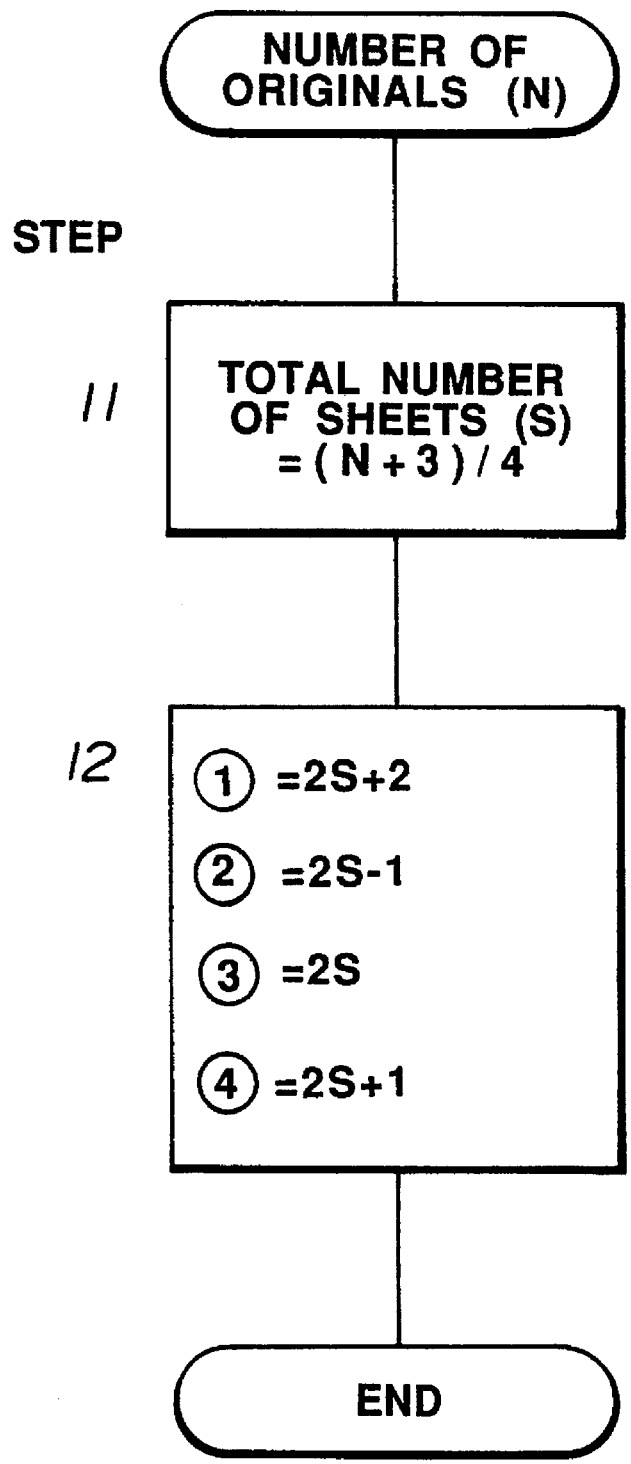
FIG. 14 is a flowchart illustrating a routine of setting a central page in a binding mode.

FIG. 14 is a flowchart illustrating the routine for setting a central page in the binding mode.

The counted number N of originals is substituted for the following expression (2) to obtain the total number S of sheets (step 11).

$$S=(N+3)/4 \qquad \text{expression (2)}.$$

Then, the order of page data corresponding to the image transfer order ①–④ shown in FIG. 12(c) is determined from the total number S of sheets using the following expression (3) (step 12).

Expression (3):

①=2S+2

②=2S−1

③=2S

④=2S+1.

According to expression (3), for example, in the case of input originals 01–08 shown in FIG. 12(a), S equals "2". The above-described image transfer order ① corresponds to input original 06, image transfer order ② corresponds to input original 03, image transfer order ③ corresponds to input original 04, and image transfer order ④ corresponds to input original 05.

Although in the above-described embodiment, a description has been provided of page setting processing in the binding process based on saddle stitch binding, any other binding method may also be easily dealt with by automatically setting the order of outputting pages to be arranged in accordance with the binding method.

The value of the number N of originals may also be input from the operation unit.

(c) An example of other processing

Although in the above-described processing (B), sheets are folded after being stacked as shown in FIG. 12(b), sheets may also be folded in a manner as shown in FIG. 16(b).

Figure 17:
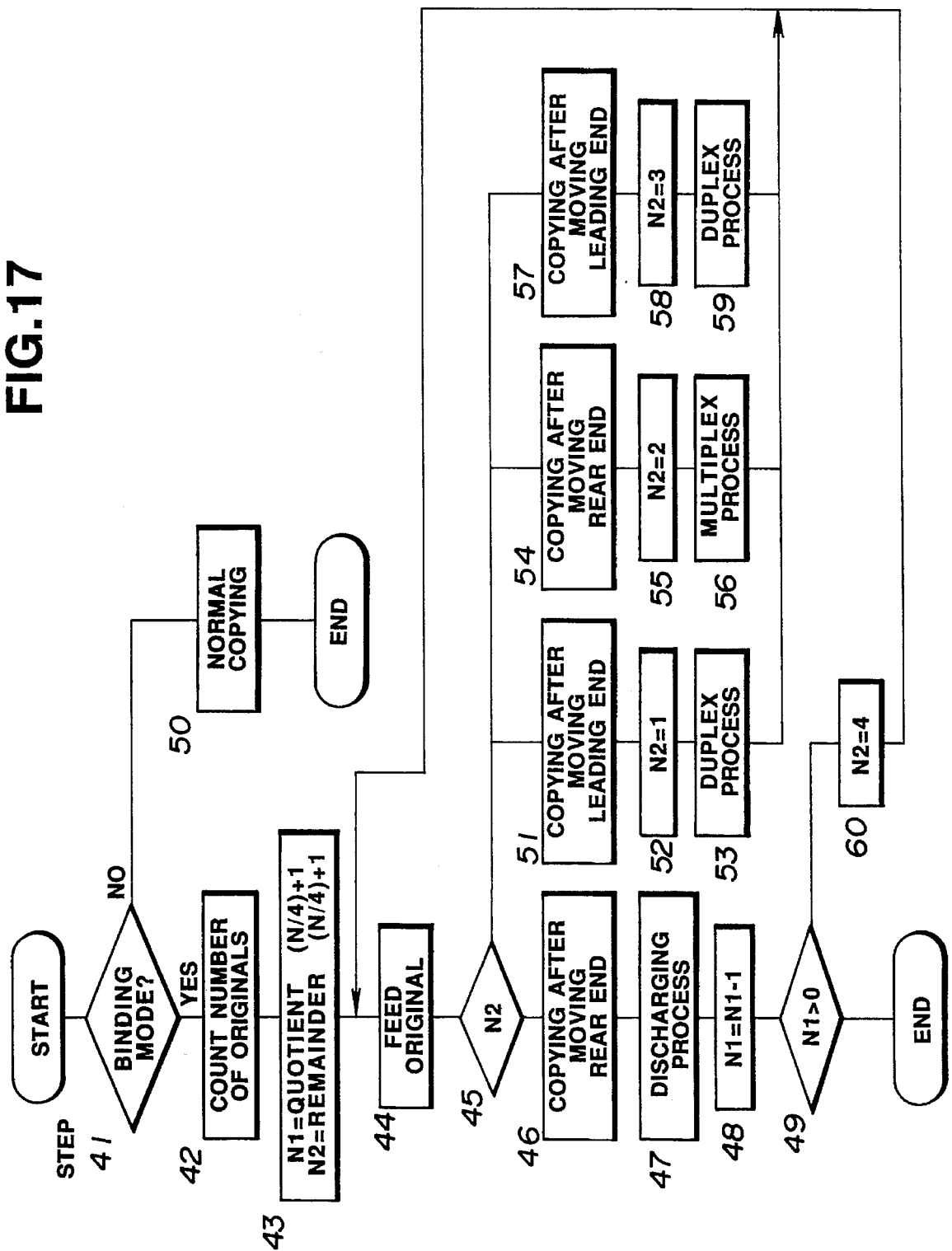
FIG. 17 is a flowchart of processing in a binding mode.

FIG. 17 is a flowchart illustrating the processing steps for such a binding mode.

First, when input originals 01–08 (FIG. 16(a)) have been set in RDF 2, and copy key (FIG. 11) has been depressed, the flow starts, and it is determined whether or not the binding mode is set through mode-assigning key 66 (step 41). If the result of the determination is negative, a normal copying operation is performed (step 50), and the process is terminated.

If the result of the determination in step 41 is affirmative, the number N of originals mounted on RDF 2 is counted (step 42). After counting the number N, processing shown in step 43 is performed. That is, the value obtained by adding 1 to the quotient obtained by dividing the number N by 4 is substituted for the value N1, and the value obtained by adding 1 to the remainder obtained by dividing the number N by 4 is substituted for the value N2.

In step 44, one original (original 08) is fed from RDF 2 to original-mount glass 3. In step 45, the value N2 set in step 43 is determined. If the value N2 equals 1, 2, 3 and 4, the processes in steps 46, 51, 54 and 57, respectively, are performed.

Figure 18A:
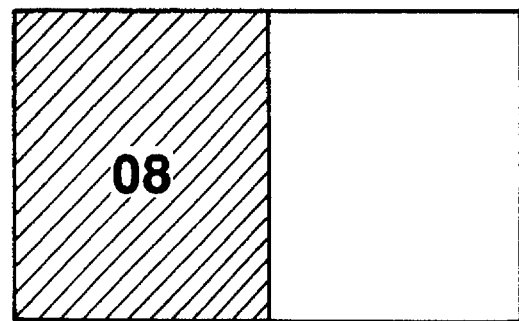
FIGS. 18(a), 18(b), 18(c), and 18(d) are schematic diagrams illustrating the flow of page-rearraging processing in the case of duplex output.

In the process of step 57, the image of original 08 is copied on the left side of paper, as shown in FIG. 18(a). Thereafter, value 3 is substituted for the value N2 (step 58).

Then, the recording paper on which the image has been copied is reversed as it passes through a duplex path (step 59).

Then, the process returns to step 44, where the next original 07 is fed onto original-mount glass 3. Since value 3 is currently substituted for the value N2, the process proceeds to step 54 after a determination of the value N2 in step 45.

Figure 18B:
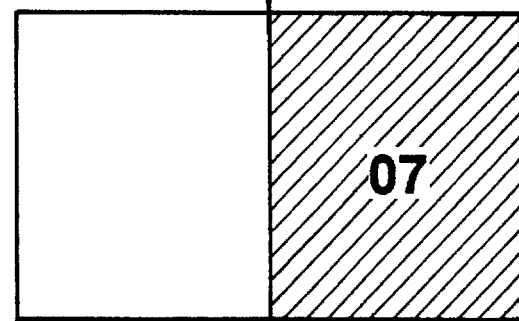

In step 54, original 07 is copied to the right side of the recording paper, as shown in FIG. 18(b). Then, value 2 is substituted for the value N2 (step 55). Thereafter, the recording paper is passed along the multiplex path in order to perform a copying operation on the same surface (step 56), and the process returns to step 44.

Then, in step 44, the next original 06 is fed onto original-mount glass 3. Since value 2 was substituted for the value N2, the process proceeds to step 51 after a determination of value N2 in step 45.

Figure 18C:
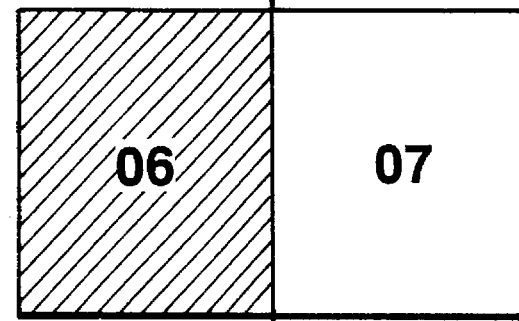

In step 51, the image of original 06 is copied on the left side of the paper, as shown in FIG. 18(c). Then, value 1 is substituted for the value N2 (step 52). Thereafter, the recording paper on which the image has been copied is reversed as it passes along the duplex path in order to perform a copying operation on the back of the recording paper (step 53), and the process returns to step 44.

Then, in step 44, the next original 05 is fed onto original-mount glass 3. Since value 1 was substituted for the value N2, the process proceeds to step 46 after a determination of the value N2 in step 45.

Figure 18D:
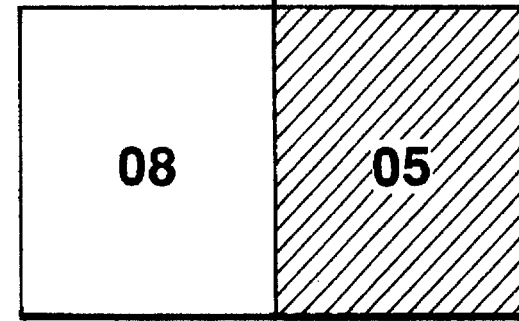

In step 46, as shown in FIG. 18(d), original 05 is copied on the right side, i.e., the rear end, of the recording paper.

Then, in step 47, the recording paper on which the image has been copied is discharged outside the apparatus. In step 48, the calculation of N1=N1−1 is performed. In step 49, it is determined whether or not N1>0 (whether or not the next original is present). If the result of the determination is negative, the copying process is terminated. If the result of the determination is affirmative, value 4 is substituted for the value N2, and the same processing is repeated after step 44.

The same processing is performed according to the above-described procedure also when N2 equals 3, 2 and 1.

In the above-described image forming apparatus having RDF 2, which can recycle originals, of the present embodiment, when the original-number counting means has counted the number of originals to be copied, the changing means changes the order of copying originals based on the counted number of originals so that the images of originals are sequentially output onto two surfaces of respective sheets of recording paper (a recording medium) in accordance with the changed order of copying originals.

As a result, a copying operation can be performed without providing a large-capacity memory for storing the images of originals.

The changing means can sequentially output the images of originals onto two surfaces of respective sheets of recording paper while automatically changing the order of copying originals based on binding conditions of output sheets of the recording paper.

The changing means can also sequentially output the images of originals onto two surfaces of respective sheets of recording paper while automatically changing the order of copying originals so that sheets of the recording paper provide normal continuous pages in a state of being folded in halves.

The individual components shown in outline or designated by blocks in the drawings are all well-known in the image forming apparatus arts and their specific construction and operation are not critical for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims.

What is claimed is:

1. An image forming apparatus comprising a recycling automatic original document feeder for automatically feeding a plurality of originals mounted on an original mount to an image reading position and for discharging the originals so as to be returned onto the original mount after the images of the originals have been read, said apparatus comprising:

image reading means for reading the image of an original at the image reading position;

image forming means for forming the image read by said image reading means on a sheet;

mode setting means for setting an image forming mode;

copy-number setting means for setting a required number of image copies for each of said originals;

sheet conveying means; and an intermediate tray for storing the sheet after image formation, wherein, when said mode setting means is a single-sided original—duplex or multiplex image forming mode, and the number of copies set by use of said copy-number setting means is a plurality of copies, one of first and second image forming modes is selectable, wherein, (1) in the first image forming mode there is a first recycling operation in which each original is recycled, an image is formed from every other original while a total number of originals is counted, sheets with formed images are stored in the intermediate tray, sheets are alternately fed for image formation from a sheet feeding unit and the intermediate tray in respective recycling operations from a second recycling operation up to a final recycling operation corresponding to the number of copies, and image formation is performed while reading every other original and feeding sheets from the intermediate tray in the final recycling operation, and (2) in the second image forming mode, image formation is performed while performing only one recycling operation, said apparatus further comprising:

means for selecting switching between the first image forming mode and the second image forming mode; and original-number counting means, wherein, when a recovering operation is performed after a jam, one of the first image forming mode and the second image forming mode is selected by said switching means in accordance with the number of originals counted.

2. An image forming apparatus according to claim 1, wherein the second image forming mode is selected when the number of originals is small and the first image forming mode is selected when the number of originals is large.

3. An image forming apparatus according to claim 1, wherein the second image forming mode is selected when the required number of copies has a large value, and the first image forming mode is selected when the required number of copies has a small value.

4. An image forming apparatus comprising a recycling automatic original document feeder for automatically feeding a plurality of originals mounted on an original mount to an image reading position and for discharging the originals so as to be returned onto the original mount after images of the originals have been read, said apparatus comprising:

image reading means for reading the image of an original at the image reading position;

image forming means for forming the image read by said image reading means;

mode setting means for setting an image forming mode;

copy-number setting means for setting a required number of image copies for each of said originals;

sheet conveying means; and an intermediate tray for storing the sheet after image formation, wherein, when said mode setting means sets a single-sided original—duplex or multiplex image forming mode, and the number of copies set by use of said copy-number setting means is a plurality of copies, one of first and second image forming modes is selectable, wherein, (1) in the first image forming mode there is a first recycling operation in which each original is recycled, an image is formed from every other original while a total number of originals is counted, sheets with formed images are stored in the intermediate tray, sheets are alternately fed for image formation from a sheet feeding unit and the intermediate tray in respective recycling operations from a second recycling operation up to a final recycling operation corresponding to the number of copies, and image formation is performed while reading every other original and feeding sheets from the intermediate tray in the final recycling operation, and (2) in the second image forming mode, image formation is performed while performing only one recycling operation, said apparatus further comprising:

means for selecting switching between the first image forming mode and the second image forming mode, wherein, when a recovering operation is performed after a jam, one of the first image forming mode and the second image forming mode is selected by said switching means in accordance with the required number of remaining copies.

5. An image forming apparatus comprising a recycling automatic original document feeder for automatically feeding a plurality of originals mounted on an original mount to an image reading position and for discharging the originals so as to be returned onto the original mount after images of the originals have been read, said apparatus comprising:

image reading means for reading the image of an original at the image reading position;

image forming means for forming the image read by said image reading means on a sheet;

mode setting means for setting an image forming mode;

copy-number setting means for setting a required number of image copies for each of the originals;

sheet conveying means; and an intermediate tray for storing the sheet after image formation, wherein, when said mode setting means sets a "single-sided original—duplex or multiplex image forming mode", and the number of copies set by use of said copy-number setting means is a plurality of copies, one of first and second image forming modes is selectable, wherein (1) in the first image forming mode there is a first recycling operation in which each original is recycled, an image is formed from every other original while a total number of originals is counted, sheets with formed images are stored in the intermediate tray, sheets are alternately fed for image formation from a sheet feeding unit and the intermediate tray in respective recycling operations from a second recycling operation up to a final recycling operation corresponding to the number of copies, and image formation is performed while reading every other original and feeding sheets from the intermediate tray in the final recycling operation, and (2) in the second image forming mode, image formation is performed while performing only one recycling operation, said apparatus further comprising:

switching means for selectively switching between the first image forming mode and the second image forming mode, wherein said switching means comprises means for manually selecting one of the first image forming mode and the second image forming mode when a recovering operation is performed after a jam occurs while the "single-sided original—duplex or multiplex image forming mode" is set.

\* \* \* \* \*

UNITED STATES PATENT AND TRADEMARK OFFICE
CERTIFICATE OF CORRECTION

PATENT NO. : 5,517,295
DATED : May 14, 1996
INVENTOR(S) : SATOSHI KANEKO, ET AL.

It is certified that error appears in the above-indentified patent and that said Letters Patent is hereby corrected as shown below:

Column 3,
    line 6, "providedd" should read --provided--;
    line 46, "invenition" should read --invention--; and
    line 49, "together" should read --together a--.
Column 5,
    line 7, "illumiated" should read --illuminated--.
Column 8,
    line 57, "copies. When" should read --copies, when--.
Column 9,
    line 28, "numer" should read --number--.
Column 12,
    line 20, "forming" (2nd occurrence) should be deleted; and
    line 59, "is" (2nd occurrence) should be deleted.
Column 13,
    line 36, "operation" should read --operation,--; and
    line 55, "photoelectrically-" should read --photoelectrically--.

UNITED STATES PATENT AND TRADEMARK OFFICE
CERTIFICATE OF CORRECTION

PATENT NO. : 5,517,295
DATED : May 14, 1996
INVENTOR(S) : SATOSHI KANEKO, ET AL.

It is certified that error appears in the above-indentified patent and that said Letters Patent is hereby corrected as shown below:

Column 19,
    line 57, "claim 1," should read --claims 1, 4 or 5,--;
and
    line 61, "claim 1," should read --claims 1, 4 or 5,--.

Signed and Sealed this

Twenty-ninth Day of October 1996

Attest:

BRUCE LEHMAN

*Attesting Officer*   *Commissioner of Patents and Trademarks*